(12) United States Patent
Sekiguchi et al.

(10) Patent No.: US 10,580,447 B2
(45) Date of Patent: Mar. 3, 2020

(54) MAGNETIC RECORDING MEDIUM WITH CONTROLLED SURFACE CHARACTERISTICS

(71) Applicant: Sony Corporation, Tokyo (JP)

(72) Inventors: Noboru Sekiguchi, Miyagi (JP); Tomoe Ozaki, Miyagi (JP); Tetsuo Endo, Miyagi (JP); Takashi Aizawa, Miyagi (JP); Junichi Tachibana, Miyagi (JP); Hikaru Terui, Miyagi (JP); Teruo Sai, Miyagi (JP)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 15/573,374

(22) PCT Filed: May 12, 2016

(86) PCT No.: PCT/JP2016/002337
§ 371 (c)(1),
(2) Date: Nov. 10, 2017

(87) PCT Pub. No.: WO2016/185695
PCT Pub. Date: Nov. 24, 2016

(65) Prior Publication Data
US 2018/0137887 A1      May 17, 2018

(30) Foreign Application Priority Data
May 18, 2015 (JP) .................................. 2015-100859

(51) Int. Cl.
*G11B 5/667* (2006.01)
*G11B 5/66* (2006.01)
(Continued)

(52) U.S. Cl.
CPC ................ *G11B 5/667* (2013.01); *G11B 5/65* (2013.01); *G11B 5/653* (2013.01); *G11B 5/656* (2013.01);
(Continued)

(58) Field of Classification Search
None
See application file for complete search history.

(56) References Cited

U.S. PATENT DOCUMENTS 6,251,496 B1 * 6/2001 Maezawa ................. G11B 5/64
427/128
6,372,367 B1 * 4/2002 Matsuda ................... B32B 3/02
428/831.2
(Continued)

FOREIGN PATENT DOCUMENTS

| JP | 2005-196885 A | 7/2005 |
| JP | 2005-293787 A | 10/2005 |
| JP | 2007-250059 A | 9/2007 |

OTHER PUBLICATIONS

International Search Report (with English translation) dated Aug. 2, 2016 in corresponding international application No. 002337 (5 pages).
(Continued)

*Primary Examiner* — Kevin M Bernatz
(74) *Attorney, Agent, or Firm* — K&L Gates LLP

(57) ABSTRACT

A magnetic recording medium has a recording surface having an average surface roughness SRa of 3.0 nm or less, the number of projections having a height of 7.5 nm or more included in a unit region (where the unit region is a square region with each side having a length of 30 μm) of the recording surface is 256 or more, and the number of pro-
(Continued)

jections having a height of 15 nm or more included in the unit region of the recording surface is 0 or more and 104 or less.

21 Claims, 14 Drawing Sheets

(51) Int. Cl.
*G11B 5/733* (2006.01)
*G11B 5/65* (2006.01)
*G11B 5/70* (2006.01)
*G11B 5/73* (2006.01)

(52) U.S. Cl.
CPC .............. *G11B 5/66* (2013.01); *G11B 5/70* (2013.01); *G11B 5/733* (2013.01); *G11B 5/73925* (2019.05); *G11B 5/73935* (2019.05)

(56) References Cited

U.S. PATENT DOCUMENTS

| | | | | |
|---|---|---|---|---|
| 6,395,412 B1 * | 5/2002 | Honda | ............... | G11B 5/656 428/212 |
| 6,468,628 B2 * | 10/2002 | Sueoka | ............... | G11B 5/64 428/141 |
| 6,652,953 B2 * | 11/2003 | Komatsu | ............... | G11B 5/708 428/141 |
| 7,026,064 B1 * | 4/2006 | Tsunekawa | ............... | B29C 59/16 428/141 |
| 2006/0088735 A1 * | 4/2006 | Endou | ............... | G11B 5/72 428/833.5 |
| 2007/0042227 A1 * | 2/2007 | Iwasaki | ............... | G11B 5/65 428/832 |
| 2008/0020243 A1 * | 1/2008 | Mori | ............... | C07C 68/02 428/836.1 |
| 2013/0314815 A1 * | 11/2013 | Yuan | ............... | G11B 5/65 360/59 |

OTHER PUBLICATIONS

Written Opinion dated Aug. 2, 2016 in corresponding international application No. PCT/JP2016/002337 (6 pages).

* cited by examiner

MAGNETIC RECORDING MEDIUM WITH CONTROLLED SURFACE CHARACTERISTICS

CROSS-REFERENCE TO RELATED APPLICATIONS

The present application claims the benefit of International Application No. PCT/JP2016/002337, filed May 12, 2016, which claims priority to Japanese Application No. 2015-100859, filed May 18, 2015, the disclosures of which are incorporated herein by reference.

BACKGROUND

The present technique relates to a magnetic recording medium, and more particularly relates to a magnetic recording medium for use in recording data or the like.

In recent years, a demand for an increase in the recording density of tape media for data storage has increased due to the development of the IT (information technique) society, the electronization of libraries, Public Record Offices, and the like, and the long-term storage of business documents.

As a high recording density magnetic tape, a magnetic recording medium in which a plurality of thin films are formed on a nonmagnetic base material by a sputtering method or the like has been proposed. For example, Patent Literature 1 discloses a magnetic recording medium in which at least an amorphous layer, a seed layer, a foundation layer, a magnetic layer, and a protective layer are successively formed on a nonmagnetic base material.

CITATION LIST

Patent Literature

Patent Literature 1: JP 2005-196885A

SUMMARY

It has been desired in the high recording density magnetic tape that the magnetic tape surface is smoothed in order to obtain good recording and reproducing properties. However, when the magnetic tape surface is smoothed, friction tends to increase. Thus, it is difficult to achieve both good recording and reproducing properties and low friction. Moreover, in terms of friction, it is particularly desired to reduce high-speed friction that contributes to running properties during actual running.

Therefore, the present technique has an object to provide a magnetic recording medium that can achieve both good recording and reproducing properties and low high-speed friction.

To achieve the above object, the present technique is a magnetic recording medium including: a base substance having flexibility; a crystal control layer provided on the base substance; and a magnetic layer provided on the crystal control layer. The magnetic recording medium has a recording surface having an average surface roughness SRa of 3.0 nm or less, the number of projections having a height of 7.5 nm or more included in a unit region (where the unit region is a square region with each side having a length of 30 µm) of the recording surface is 256 or more, and the number of projections having a height of 15 nm or more included in the unit region of the recording surface is 0 or more and 104 or less.

As described above, according to the present technique, it is possible to achieve both good recording and reproducing properties and low high-speed friction.

DETAILED DESCRIPTION

Figure 1:
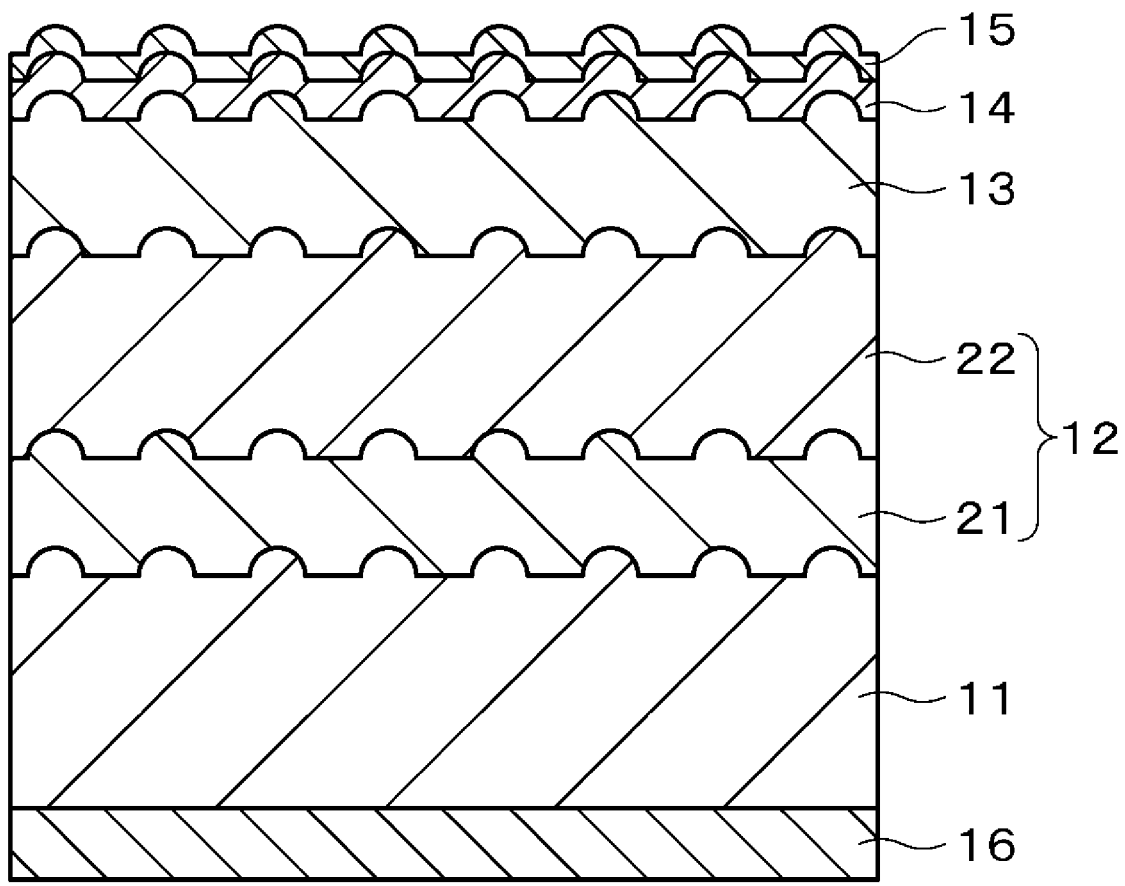
FIG. 1 is a cross sectional view schematically illustrating an example of the configuration of a magnetic recording medium according to a first embodiment of the present technique.

Embodiments of the present technique are described in the following order.

1 First Embodiment (Example of Magnetic Recording Medium Whose Base Substance Has Uneven Surface Substantially Similar to Recording Surface)
1.1 Outline
1.2 Configuration of Magnetic Recording Medium
1.3 Configuration of Sputtering Device
1.4 Method for Manufacturing Magnetic Recording Medium
1.5 Effect
1.6 Modification
2 Second Embodiment (Example of Magnetic Recording Medium Further Having Uneven Layer Having Uneven Surface Substantially Similar to Recording Surface)
2.1 Configuration of Magnetic Recording Medium
2.2 Method for Manufacturing Magnetic Recording Medium
2.3 Effect
3 Third Embodiment (Example of Magnetic Recording Medium Having Seed Layer Having Two-Layer Structure)
3.1 Configuration of Magnetic Recording Medium
3.2 Effect
4 Fourth Embodiment (Example of Magnetic Recording Medium Having Foundation Layer Having Two-Layer Structure))
4.1 Configuration of Magnetic Recording Medium
4.2 Effect
4.3 Modification
5 Fifth Embodiment (Example of Magnetic Recording Medium Further Having Soft Magnetic Underlayer Having Single Layer Structure)
5.1 Configuration of Magnetic Recording Medium
5.2 Effect
5.3 Modification
6 Sixth Embodiment (Example of Magnetic Recording Medium Further Having Soft Magnetic Underlayer Having Multilayer Structure)
6.1 Configuration of Magnetic Recording Medium
6.2 Effect
6.3 Modification
7 Seventh Embodiment (Example of Magnetic Recording Medium Having Seed Layer Containing Cr, Ni, and Fe and Intermediate Layer Containing Co and O)
7.1 Configuration of Magnetic Recording Medium
7.2 Effect
7.3 Modification

[1.1 Outline]

Inventors of the present application have conducted intensive studies in order to achieve both good recording and reproducing properties and low high-speed friction. First, as a result of studying an arithmetic average roughness SRa at a surface of a magnetic recording medium, it has been found out that if the arithmetic average roughness SRa does not satisfy the relation SRa≤3.0 nm, there is a tendency that good recording and reproducing properties cannot be obtained.

Next, on the assumption that the average surface roughness SRa satisfies the relation SRa≤3.0 nm, achievement of both good recording and reproducing properties and low high-speed friction was studied paying attention to the number of projections at the recording surface. As a result, the following characteristics have been found out.

(A) There is a correlation between the number of projections having a height of 7.5 nm or more included in a unit region (where the unit region is a square region with each side having a length of 30 μm) of a recording surface and high-speed friction, and if the number of projections having a height of 7.5 nm or more included in the unit region is 256 or more, low high-speed friction is obtained.

(B) There is a correlation between the number of projections having a height of 15 nm or more included in the unit region of the recording surface and recording and reproducing properties, and if the number of projections having a height of 15 nm or more included in the unit region is 0 or more and 104 or less, good recording and reproducing properties are obtained.

From the above studies, the inventors of the present application have found out the following. That is, when the number of projections having a height of 7.5 nm or more included in the unit region of the recording surface is 256 or more and the number of projections having a height of 15 nm or more included in the unit region of the recording surface is 0 or more and 104 or less under the condition that the average surface roughness SRa satisfies the relation SRa≤3.0 nm, it is possible to achieve both good recording and reproducing properties and low high-speed friction.

[1.2 Configuration of Magnetic Recording Medium]

A magnetic recording medium according to a first embodiment of the present technique is a single layer vertical magnetic recording medium having a so-called long shape, and as illustrated in FIG. 1, includes a base substance 11, a crystal control layer 12 provided on one major surface (hereinafter referred to as a "surface") of the base substance 11, a magnetic layer 13 provided on the crystal control layer 12, a protective layer 14 provided on the magnetic layer 13, and a lubricant layer 15 provided on the protective layer 14. The magnetic recording medium according to the first embodiment further includes a backcoat layer 16 provided on the other major surface (hereinafter referred to as a "rear surface") of the base substance 11.

The crystal control layer 12 includes a seed layer 21 provided on the surface of the base substance 11, and a foundation layer 22 provided on the seed layer 21. It is preferable that a laminated film composed of the crystal control layer 12, the magnetic layer 13, and the protective layer 14 is a sputtering film formed by a sputtering method.

Note that a recording medium not having a soft magnetic underlayer is referred to as a "single layer vertical magnetic recording medium", and a recording medium having a soft magnetic underlayer as a "two-layer vertical magnetic recording medium" in the present specification. Moreover, of the both major surfaces of the magnetic recording medium according to the first embodiment, a major surface on the side with which a recording head or recording and reproducing head makes contact when recording an information signal is referred to as a recording surface.

The magnetic recording medium according to the first embodiment is suitably used as storage media for data archives for which a demand is expected to further increase in the future. The magnetic recording medium can realize a surface recording density of 10 times or more that of a current coating type magnetic tape for storage, i.e., surface recording density of 50 Gb/in$^2$, for example. When constituting a general linear recording type data cartridge employing the magnetic recording medium having such a surface recording density, mass recording of 50 TB or more per data cartridge can be achieved. The magnetic recording medium is suitably used for a recording and reproducing device employing a ring type recording head and a giant magnetoresistive (GMR) type reproducing head.

(Recording Surface)

The magnetic recording medium according to the first embodiment has a recording surface having a long shape. The recording surface has microscopic unevenness. The average surface roughness SRa of the recording surface is 3.0 nm or less. If the average surface roughness SRa exceeds 3.0 nm, there is a tendency that good recording and reproducing properties cannot be obtained.

The number of projections having a height of 7.5 nm or more included in the unit region of the recording surface is 256 or more, preferably 256 or more and 3000 or less. If the number of projections having a height of 7.5 nm or more is less than 256, high-speed friction of the recording surface tends to increase. From the viewpoint of reducing high-speed friction of the recording surface, the number of projections having a height of 7.5 nm or more included in the unit region of the recording surface is preferably 500 or more and 3000 or less, more preferably 1000 or more and 3000 or less, still more preferably 2000 or more and 3000 or less, and most preferably 2500 or more and 3000 or less. Here, the unit region refers to a square measurement region with each side having a length of 30 μm.

The number of projections having a height of 15 nm or more included in the unit region of the recording surface is 0 or more and 104 or less. If the number of projections having a height of 15 nm or more exceeds 104, recording and reproducing properties tend to deteriorate. From the viewpoint of improving recording and reproducing properties, the number of projections having a height of 15 nm or more included in the unit region of the recording surface is preferably 0 or more and 75 or less, more preferably 0 or more and 50 or less, still more preferably 0 or more and 25 or less, and most preferably 0 or more and 10 or less.

(Base Substance)

The base substance 11 to be a base material has a long shape. The base substance 11 has an uneven surface including microscopic unevenness on the recording surface side. The uneven surface of the base substance 11 has an uneven shape substantially similar to the unevenness of the recording surface. Specifically, for example, the average surface roughness SRa of the surface of the base substance 11 is 3.0 nm or less. The number of projections having a height of 7.5 nm or more included in the unit region of the surface of the base substance 11 is 256 or more and 3000 or less. The number of projections having a height of 15 nm or more included in the unit region of the surface of the base substance 11 is 0 or more and 104 or less.

When the uneven surface of the base substance 11 has an uneven shape substantially similar to the unevenness of the recording surface on the recording surface side, the recording surface can be an uneven surface that substantially conforms to the uneven surface of the base substance 11 to form the recording surface that satisfies the average surface roughness SRa and the number of projections described above by laminating the crystal control layer 12, the magnetic layer 13, and the protective layer 14 so as to conform to the uneven surface of the base substance 11.

From the viewpoint of reducing high-speed friction of the recording surface, the number of projections having a height of 7.5 nm or more included in the unit region of the uneven surface of the base substance 11 is preferably 500 or more and 3000 or less, more preferably 1000 or more and 3000 or less, still more preferably 2000 or more and 3000 or less, and most preferably 2500 or more and 3000 or less. From the viewpoint of improving recording and reproducing properties, the number of projections having a height of 15 nm or more included in the unit region of the uneven surface of the base substance 11 is preferably 0 or more and 75 or less, more preferably 0 or more and 50 or less, still more preferably 0 or more and 25 or less, and most preferably 0 or more and 10 or less.

The base substance 11 is a nonmagnetic base substance having flexibility, specifically, a polymer film. As a material of the nonmagnetic base substance, a flexible polymer resin material for use in the nonmagnetic base substance of general magnetic recording media can be used, for example. Specific examples of such a polymer material include polyesters, polyolefins, cellulose derivatives, vinyl resin, polyimides, polyamides, polycarbonate, or the like.

(Seed Layer)

It is preferable that the seed layer 21 contains an alloy containing Ti and Cr and the alloy has an amorphous state. Specifically, it is preferable for the seed layer 21 to contain an alloy containing Ti and Cr and to have an amorphous state. The alloy may further contain O (oxygen). The oxygen is impurity oxygen contained in a small proportion in the seed layer 21 when forming the seed layer 21 by a film forming method, such as a sputtering method, for example. Herein, the "seed layer" does not refer to an intermediate layer having a crystal structure similar to that of the foundation layer 22 and provided for crystal growth and refers to an intermediate layer which improves the vertical orientation properties of the foundation layer 22 due to the amorphous state of the seed layer 21. The "alloy" means at least one of a solid solution containing Ti and Cr, an eutectic crystal, an intermetallic compound, and the like. The "amorphous state" means that halo is observed by an electron diffraction method and the crystal structure may not be specified.

The seed layer 21 containing an alloy containing Ti and Cr and having an amorphous state has effects of suppressing the influence of $O_2$ gas and $H_2O$ adsorbing to the base substance 11. Due to the effects, the vertical orientation properties of the foundation layer 22 are improved.

The proportion of O (oxygen) based on the total amount of Ti, Cr, and O contained in the seed layer 21 is preferably 15 atomic % (at %) or less and more preferably 10 atomic % or less. When the proportion of oxygen exceeds 15 atomic %, a $TiO_2$ crystal generates, which exerts an influence on the formation of the crystal nucleus of the foundation layer 22 to be formed on the surface of the seed layer 21, so that the orientation properties of the foundation layer 22 greatly decrease.

The proportion of Ti based on the total amount of Ti and Cr contained in the seed layer 21 is preferably in the range of 30 atomic % or more and 100 atomic % or less and more preferably in the range of 50 atomic % or more and 100 atomic % or less. When the proportion of Ti is less than 30%, the (100) plane of the body-centered cubiclattice (bcc) structure of Cr is oriented, so that the orientation properties of the foundation layer 22 to be formed on the surface of the seed layer 21 decreases.

The proportion of the elements above can be determined as follows. Etching by ion beams is performed from the side of the lubricant layer 15 of the magnetic recording medium, the outermost surface of the etched the seed layer 21 is subjected to an analysis by Auger electron spectroscopy, and then the average atomic number ratio based on the film thickness is defined as the proportion of the element. Specifically, the three elements of Ti, Cr, and O are analyzed, and then the element amount in terms of percentage ratio is identified.

The alloy contained in the seed layer 21 may further contain elements other than Ti and Cr as additional elements. Examples of the additional elements include one or more elements selected from the group consisting of Nb, Ni, Mo, Al, W, and the like, for example.

(Foundation Layer)

It is preferable for the foundation layer 22 to have the same crystal structure as that of the magnetic layer 13. When the magnetic layer 13 contains a Co alloy, it is preferable that the foundation layer 22 contains a material having the same hexagonal close-packed (hcp) structure as that of the Co alloy and that the c-axis of the structure is vertically oriented (i.e., film thickness direction) to the film surface. This is because the orientation properties of the magnetic layer 13 can be improved and the grating constants of the foundation layer 22 and the magnetic layer 13 can be relatively favorably matched. As the material having the hexagonal close-packed (hcp) structure, materials containing Ru are preferably used and specifically a Ru simple substance or a Ru alloy is preferable. Examples of the Ru alloy include Ru alloy oxides, such as Ru—$SiO_2$, Ru—$TiO_2$, or Ru—$ZrO_2$, for example.

(Magnetic Layer)

The magnetic layer 13 is preferably a granular magnetic layer containing a Co alloy from the viewpoint of improving recording density. This granular magnetic layer contains ferromagnetic crystal particles containing a Co alloy and a nonmagnetic grain boundary (nonmagnetic material) surrounding the ferromagnetic crystal particles. More specifically, the granular magnetic layer contains columns (columnar crystal) containing a Co alloy and a nonmagnetic grain boundary (for example, oxides, such as $SiO_2$) which surrounds the columns and which magnetically isolate each column. This structure can constitute the magnetic layer 13 having the structure in which each column is magnetically isolated.

The Co alloy has the hexagonal close-packed (hcp) structure, in which the c-axis is vertically oriented (film thickness direction) to the film surface. As the Co alloy, a CoCrPt alloy at least containing Co, Cr, and Pt is preferably used. The CoCrPt alloy is not particularly limited and the CoCrPt alloy may further contain additional elements. Examples of the additional elements include one or more elements selected from the group consisting of Ni, Ta, and the like, for example.

The nonmagnetic grain boundary surrounding the ferromagnetic crystal particles contains a nonmagnetic metal material. Herein, the metal includes semimetal. As the nonmagnetic metal material, at least one of a metal oxide and a metal nitride can be used, for example. From the viewpoint of more stably maintaining the granular structure, a metal oxide is preferably used. Examples of the metal oxide include a metal oxide containing at least one or more elements selected from the group consisting of Si, Cr, Co, Al, Ti, Ta, Zr, Ce, Y, Hf, and the like and a metal oxide containing at least a Si oxide (i.e., $SiO_2$) is preferable. Specific examples include $SiO_2$, $Cr_2O_3$, CoO, $Al_2O_3$, $TiO_2$, $Ta_2O_5$, $ZrO_2$, $HfO_2$, or the like. Examples of the metal nitride include a metal nitride containing at least one or more elements selected from the group consisting of Si, Cr, Co, Al, Ti, Ta, Zr, Ce, Y, Hf, and the like. Specific examples include SiN, TiN, or AlN. In order to more stably maintain the granular structure, it is preferable for the nonmagnetic grain boundary to contain a metal oxide among the metal nitrides and the metal oxides.

From the viewpoint of achieving a further improvement of the signal-noise ratio (SNR), it is preferable for the CoCrPt alloy contained in the ferromagnetic crystal particles and the Si oxide contained in the nonmagnetic grain boundary to have the average composition shown in the following expression. This is because the influence of a demagnetizing field can be suppressed and also the saturation magnetization Ms capable of securing a sufficient reproduction output can be realized and a high SNR can be secured.

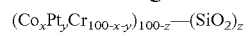

(In the expression, x, y, and z are values in the range of $69 \leq X \leq 72$, $12 \leq y \leq 16$, and $9 \leq Z \leq 12$, respectively.)

The composition above can be determined as follows. Etching by ion beams is performed from the side of the lubricant layer 15 of the magnetic recording medium, the outermost surface of the etched magnetic layer 13 is subjected to an analysis by Auger electron spectroscopy, and then the average atomic number ratio based on the film thickness is defined as the proportion of the element. Specifically, the five elements of Co, Pt, Cr, Si, and O are analyzed, and then the element amount in terms of percentage ratio is identified.

The magnetic recording medium according to this embodiment is a single layer magnetic recording medium which does not have an underlayer (soft magnetic underlayer) containing a soft magnetic material. In this kind of the magnetic recording medium, when the influence of a demagnetizing field in the vertical direction resulting from the magnetic layer 13 is large, sufficient recording in the vertical direction tends to become difficult. The demagnetizing field becomes larger in proportion to the saturation magnetization Ms of the magnetic layer 13. Therefore, in order to suppress the demagnetizing field, it is preferable to reduce the saturation magnetization Ms. However, when the saturation magnetization Ms becomes small, the remaining magnetization Mr becomes small, so that a reproduction output decreases. Therefore, the materials contained in the magnetic layer 13 are preferably selected from the viewpoint of achieving both the suppression of the influence of the demagnetizing field (i.e., reduction in the saturation magnetization Ms) and the remaining magnetization Mr capable of securing a sufficient reproduction output. In the average composition of the expression above, both these properties can be achieved and a high SNR can be secured.

It is preferable that at least two adjacent layers among the seed layer 21, the foundation layer 22, and the magnetic layer 13 are continuously formed by a Roll to Roll method and it is more preferable that all the three layers are continuously formed by a Roll to Roll method. This is because the magnetic properties and the recording and reproducing properties can be further improved.

(Protective Layer)

The protective layer 14 contains a carbon material or a silica dioxide ($SiO_2$), for example, and preferably contains a carbon material from the viewpoint of the film strength of the protective layer 14. Examples of the carbon material include graphite, diamond-like carbon (DLC), diamond, or the like, for example.

(Lubricant Layer)

The lubricant layer 15 contains a lubricant, for example. As the lubricant, silicone lubricants, hydrocarbon lubricants, fluorinated hydrocarbon lubricants, or the like can be used, for example.

(Backcoat Layer)

The backcoat layer 16 contains a binder, inorganic particles, and a lubricant. The backcoat layer 16 may contain various additives, such as a curing agent and an antistatic agent, according to necessity.

[1.3 Configuration of Sputtering Device]

Figure 2:
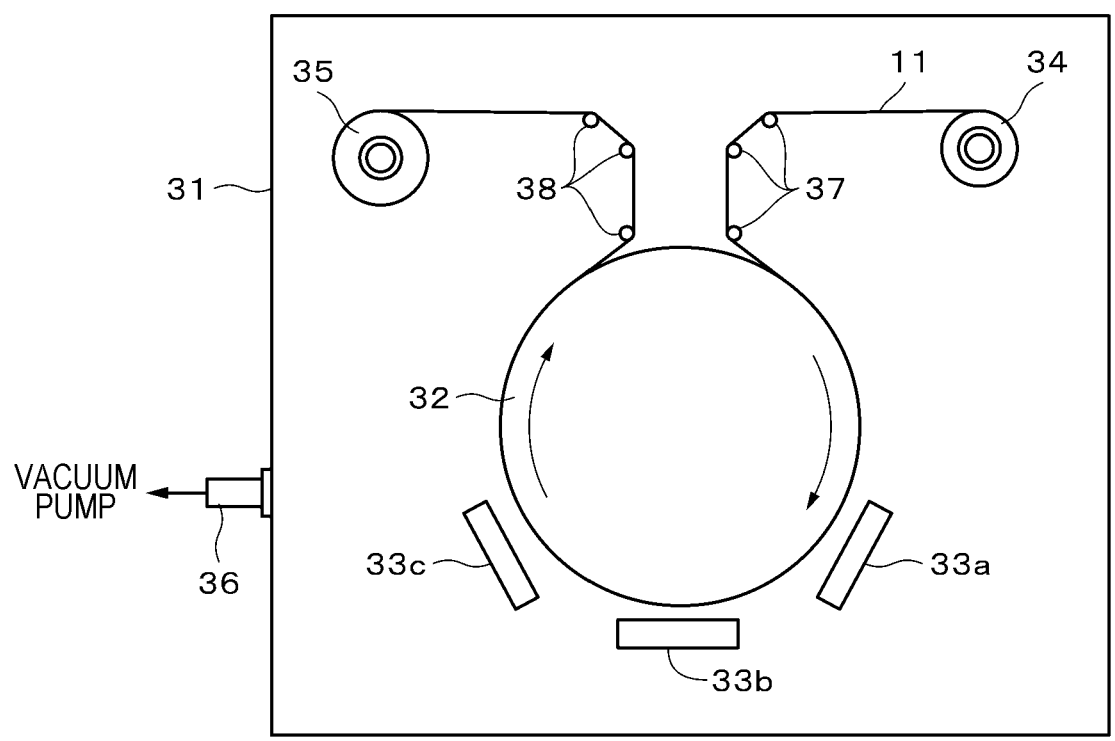
FIG. 2 is a schematic view schematically illustrating an example of the configuration of a sputtering device for use in manufacturing of the magnetic recording medium according to the first embodiment of the present technique.

Hereinafter, with reference to FIG. 2, an example of the configuration of a sputtering device for use in manufacturing of the magnetic recording medium according to the first embodiment of the present technique is described. The sputtering device is a continuous take-up sputtering device for use in the film formation of the seed layer 21, the foundation layer 22, and the magnetic layer 13 and has a film formation chamber 31, a drum 32 which is a metal can (body of rotation), cathodes 33a to 33c, a supply reel 34, a take-up reel 35, and a plurality of guide rolls 37 and 38 as illustrated in FIG. 2. The sputtering device is a DC (direct current) magnetron sputtering type device, for example, but the sputtering system is not limited to this type.

The film formation chamber 31 is connected to a vacuum pump, which is not illustrated, through an exhaust port 36. The atmosphere in the film formation chamber 31 is set to a predetermined vacuum degree by the vacuum pump. In the film formation chamber 31, the drum 32, the supply reel 34, and the take-up reel 35 which are configured to be rotatable are disposed. In the film formation chamber 31, a plurality of guide rolls 37 for guiding the feed of the base substance 11 between the supply reel 34 and the drum 32 are provided and also a plurality of guide rolls 38 for guiding the feed of the base substance 11 between the drum 32 and the take-up reel 35 are provided. In sputtering, the base substance 11 unwound from the supply reel 34 is taken up by the take-up reel 35 through the guide rolls 37, the drum 32, and the guide rolls 38. The drum 32 has a cylindrical shape and the base substance 11 having a long shape is fed along the circumferential surface having a cylindrical shape of the drum 32. The drum 32 is provided with a cooling mechanism which is not illustrated and is cooled to about −20° C., for example, in sputtering. In the film formation chamber 31, a plurality of cathodes 33a to 33c are disposed facing the circumferential surface of the drum 32. A target is set to each of the cathodes 33a to 33c. Specifically, a target for forming the seed layer 21, a target for forming the foundation layer 22, and a target for forming the magnetic layer 13 are set to the cathodes 33a, 33b, and 33c, respectively. By the cathodes 33a to 33c, two or more kinds of films, i.e., the seed layer 21, the foundation layer 22, and the magnetic layer 13 are simultaneously formed.

In the sputtering device having the above-described configuration, the seed layer 21, the foundation layer 22, and the magnetic layer 13 can be continuously formed by a Roll to Roll method.

[1.4 Method for Manufacturing Magnetic Recording Medium]

The magnetic recording medium according to the first embodiment of the present technique can be manufactured as follows, for example.

First, the seed layer 21, the foundation layer 22, and the magnetic layer 13 are formed on the surface of the base substance 11 using the sputtering device illustrated in FIG. 2. Specifically, the films are formed as follows. First, the film formation chamber 31 is evacuated until the pressure reaches a predetermined pressure. Thereafter, the targets set to the cathodes 33a to 33c are sputtered while introducing process gas, such as Ar gas, into the film formation chamber 31. Accordingly, the seed layer 21, the foundation layer 22, and the magnetic layer 13 are successively formed on the surface of the running base substance 11 so as to conform to the unevenness of the surface of the base substance 11.

The atmosphere of the film formation chamber 31 in sputtering is set to about $1\times10^{-5}$ Pa to $5\times10^{-5}$ Pa, for example. The film thickness and the properties (for example, magnetic properties) of the seed layer 21, the foundation layer 22, and the magnetic layer 13 can be controlled by adjusting the tape line speed of taking up the base substance 11, the pressure of Ar gas to be introduced in sputtering (sputtering gas pressure), the throwing power, and the like. The tape line speed is preferably in the range of about 1 m/min to 10 m/min. The sputtering gas pressure is preferably in the range of about 0.1 Pa to 5 Pa. The throwing power amount is preferably in the range of about 30 mW/mm² to 150 mW/mm².

Next, the protective layer 14 is formed on the magnetic layer 13 so as to conform to the unevenness of the surface of the magnetic layer 13. As the formation method of the protective layer 14, a chemical vapor deposition (CVD) method or a physical vapor deposition (PVD) method can be used, for example.

Next, by cutting projections at the surface of the protective layer 14 as the recording surface using a sapphire blade or the like, for example, according to necessity, the number of projections having a height of 7.5 nm or more included in the unit region of the recording surface and the number of projections having a height of 15 nm or more included in the unit region of the recording surface may be adjusted.

Next, by kneading and dispersing the binder, inorganic particles, lubricant, and the like in a solvent, a coating for backcoat layer formation is prepared. Next, by applying the coating for backcoat layer formation onto the rear surface of the base substance 11 and drying, the backcoat layer 16 is formed on the rear surface of the base substance 11.

Next, a lubricant, for example, is applied onto the protective layer 14 to form the lubricant layer 15. As the method of applying the lubricant, various application methods, such as gravure coating or dip coating, for example, can be used. Next, the magnetic recording medium is cut into a predetermined width according to necessity. As described above, the magnetic recording medium illustrated in FIG. 1 is obtained.

[1.5 Effect]

In the magnetic recording medium according to the first embodiment, the average surface roughness SRa of the recording surface is 3.0 nm or less, the number of projections having a height of 7.5 nm or more included in the unit region of the recording surface is 256 or more, and the number of projections having a height of 15 nm or more included in the unit region of the recording surface is 0 or more and 104 or less. Thus, it is possible to achieve both good recording and reproducing properties and low high-speed friction. Note that when high-speed friction decreases, running properties are improved and improvement in reliability can be achieved.

In the magnetic recording medium according to the first embodiment, it is also possible to reduce low-speed friction that contributes to the start and stop in shuttling, whilst high-speed friction that contributes to running properties during actual running can be particularly reduced.

[1.6 Modification]

The structure in which the magnetic recording medium includes the crystal control layer 12, the protective layer 14, the lubricant layer 15, and the backcoat layer 16 has been described in the first embodiment, whilst these layers are included according to necessity, and can also be omitted. Note that a structure in which at least one of the crystal control layer 12, the protective layer 14, the lubricant layer 15, and the backcoat layer 16 is omitted may be adopted.

In the first embodiment, a case where the uneven surface (the surface) of the base substance 11 has an uneven shape substantially similar to the unevenness of the recording surface has been described, whilst the uneven surface of the base substance 11 may have an uneven shape totally different from the unevenness of the recording surface. In this case, a process of cutting projections at the surface of the magnetic layer 13 may be further provided between the film formation process of the magnetic layer 13 and the film formation process of the protective layer 14 to adjust the average surface roughness SRa of the recording surface, the number of projections having a height of 7.5 nm or more included in the unit region of the recording surface, and the number of projections having a height of 15 nm or more included in the unit region of the recording surface. In addition, a process of cutting projections of the protective layer 14 may be further provided between the film formation process of the protective layer 14 and the film formation process of the lubricant layer 15 to adjust the average surface roughness SRa and the number of projections similarly to the foregoing.

2 Second Embodiment

[2.1 Configuration of Magnetic Recording Medium]

Figure 3:
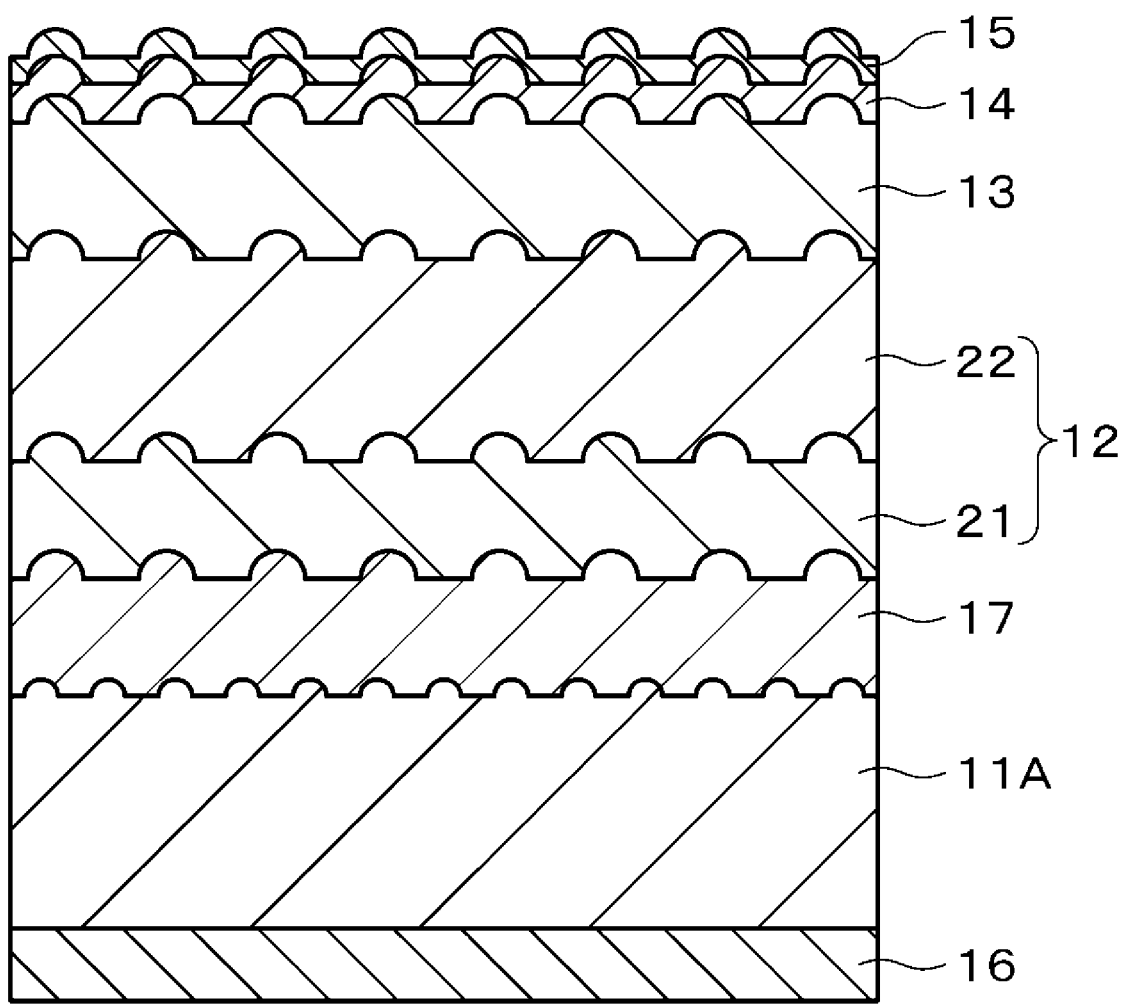
FIG. 3 is a cross sectional view schematically illustrating an example of the configuration of a magnetic recording medium according to a second embodiment of the present technique.

As illustrated in FIG. 3, a magnetic recording medium according to a second embodiment of the present technique is different from the magnetic recording medium according to the first embodiment in terms of the following structure. That is, the magnetic recording medium according to the second embodiment further includes an uneven layer 17 provided between a base substance 11A and the crystal control layer 12. In addition, an uneven surface (a surface) of the base substance 11A has an uneven shape totally different from the unevenness of the recording surface. In the second embodiment, the same components are designated by the same reference numerals as those of the first embodiment and the description is omitted.

The uneven layer 17 is a layer for forming the uneven shape of the recording surface, and has an uneven surface on the crystal control layer 12 side. The uneven surface of the uneven layer 17 has an uneven shape substantially similar to the unevenness of the recording surface. Specifically, for example, the average surface roughness SRa of the uneven surface of the uneven layer 17 is 3.0 nm or less. The number of projections having a height of 7.5 nm or more included in the unit region of the uneven surface of the uneven layer 17 is 256 or more, preferably 256 or more and 3000 or less. The number of projections having a height of 15 nm or more included in the unit region of the uneven surface of the uneven layer 17 is 0 or more and 104 or less.

When the uneven surface of the uneven layer 17 has an uneven shape substantially similar to the unevenness of the recording surface, the recording surface can be an uneven surface that substantially conforms to the uneven surface of the uneven layer 17 to form the recording surface that satisfies the average surface roughness SRa and the number of projections described above by laminating the crystal control layer 12, the magnetic layer 13, and the protective layer 14 so as to conform to the uneven surface of the uneven layer 17.

From the viewpoint of reducing high-speed friction of the recording surface, the number of projections having a height of 7.5 nm or more included in the unit region of the uneven surface of the uneven layer 17 is preferably 500 or more and 3000 or less, more preferably 1000 or more and 3000 or less, still more preferably 2000 or more and 3000 or less, and most preferably 2500 or more and 3000 or less. From the viewpoint of improving recording and reproducing properties, the number of projections having a height of 15 nm or more included in the unit region of the uneven surface of the uneven layer 17 is preferably 0 or more and 75 or less, more preferably 0 or more and 50 or less, still more preferably 0 or more and 25 or less, and most preferably 0 or more and 10 or less.

The uneven layer 17 is a nonmagnetic layer containing nonmagnetic particulate powder and a binder. The uneven layer 17 may further contain various additives, such as conductive particles, a lubricant, an abrasive, a curing agent, and a corrosion inhibitor, according to necessity. The uneven surface of the uneven layer 17 is composed of nonmagnetic particulates. Specifically, the uneven surface of the uneven layer 17 is composed of the nonmagnetic particulates protruding from the surface of the uneven layer 17.

The uneven layer 17 is a coating layer obtained by applying the coating for uneven layer formation containing nonmagnetic powder and a binder onto the surface of the base substance 11A and drying. It is possible to check whether the uneven layer 17 is a coating layer by analyzing whether the uneven layer 17 contains resin as a binder, or the like, for example.

The nonmagnetic particulate powder may be an inorganic substance or organic substance. In addition, carbon particulate powder, such as carbon black, or the like can be used. Examples of the inorganic substance include metal, metal oxide, metal carbonate, metal sulfate, metal nitride, metal carbide, and metal sulfide. Examples of the shape of nonmagnetic particulate powder include various shapes, such as acicular shape, spherical shape, and plate-like shape, but are not limited to them.

As the binder, a resin of a structure obtained by imparting a cross-linking reaction to a polyurethane-based resin, a vinyl chloride-based resin, or the like is preferable. However, the binder is not limited to them, but another resin may be blended as necessary in accordance with physical properties required of the magnetic recording medium, or the like. A resin to be blended is not particularly limited as long as it is used commonly for a coating type magnetic recording medium.

Examples include vinyl chloride, vinyl acetate, vinyl chloride-vinyl acetate copolymer, vinyl chloride-vinylidene chloride copolymer, vinyl chloride-acrylonitrile copolymer, acrylate-acrylonitrile copolymer, acrylate-vinyl chloride-vinylidene chloride copolymer, vinyl chloride-acrylonitrile copolymer, acrylate-acrylonitrile copolymer, acrylate-vinylidene chloride copolymer, methacrylate-vinylidene chloride copolymer, methacrylate-vinyl chloride copolymer, methacrylate-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene-butadiene copolymer, polyester resin, amino resin, synthetic rubber, and the like.

Moreover, examples of a thermosetting resin or reactive resin include phenolic resin, epoxy resin, urea resin, melamine resin, alkyd resin, silicone resin, polyamine resin, urea formaldehyde resin, and the like.

In addition, for the purpose of improving dispersibility of magnetic powder, a polar functional group, such as —$SO_3M$, —$OSO_3M$, or —COOM, or P=O(OM)$_2$ may be introduced into each of the above-described binders. Here, in the expressions, M is a hydrogen atom or alkali metal, such as lithium, potassium, or sodium.

Furthermore, polar functional groups include a side chain type having an end group of —NR1R2, —NR1R2R3+X−, and a main chain type of >NR1R2+X−. Here, in the expressions, R1, R2, and R3 are hydrogen atoms or hydrocarbon groups, and X− is a halogen element ion, such as fluorine, chlorine, bromine or iodine, or an inorganic or organic ion. In addition, polar functional groups also include —OH, —SH, —CN, epoxy group, and the like.

Moreover, polyisocyanate may be used in combination with a resin, and this may be subjected to crosslink curing.

Examples of polyisocyanate include toluene diisocyanate and their adducts, alkylene diisocyanate and their adducts, and the like.

As the conductive particles, particulates composed primarily of carbon, for example, carbon black can be used. As carbon black, Asahi #15, #15HS, or the like manufactured by ASAHI CARBON CO., LTD. can be used, for example. Alternatively, hybrid carbon in which carbon adheres to the surface of silica particles may be used.

As the lubricant, for example, an ester of a monobasic fatty acid containing 10 to 24 carbon atoms and any of monohydric to hexahydric alcohols containing 2 to 12 carbon atoms, their mixed ester, or di-fatty acid ester, or tri-fatty acid ester can be used as necessary. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like.

Examples of the abrasive include $\alpha$-alumina having a gelatinization degree of 90% or more, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular $\alpha$-iron oxide obtained by dehydrating and annealing a raw material of magnetic iron oxide, and a material obtained by subjecting them to a surface treatment with aluminum and/or silica where necessary, and the like, used alone or in combination.

[2.2 Method for Manufacturing Magnetic Recording Medium]

A method for manufacturing the magnetic recording medium according to the second embodiment of the present technique is different from the above-described method for manufacturing the magnetic recording medium according to the first embodiment in that a process of forming the uneven layer 17 on the surface of the base substance 11A is further provided before the process of forming the seed layer 21. Therefore, only the film formation process of the uneven layer 17 will be described below.

First, by kneading and dispersing nonmagnetic powder, a binder, and the like in a solvent, a coating for uneven layer formation is prepared. The following solvent, dispersing device, and kneading device, for example, can be applied to preparation of the coating for uneven layer formation.

Examples of the solvent for use in the above-described coating preparation include ketone-based solvents such as acetone, methyl ethyl ketone, methyl isobutyl ketone, and cyclohexanone, alcoholic solvents such as methanol, ethanol, and propanol, ester-based solvents such as methyl acetate, ethyl acetate, butyl acetate, propyl acetate, ethyl lactate, and ethylene glycol acetate, ether-based solvents such as diethylene glycol dimethyl ether, 2-ethoxyethanol, tetrahydrofuran, and dioxane, aromatic hydrocarbon-based solvents such as benzene, toluene, and xylene, halogenated hydrocarbon-based solvents such as methylene chloride, ethylene chloride, carbon tetrachloride, chloroform, and chlorobenzene, and the like. They may be used alone, or may be used in a mixed state as necessary.

As the kneading device for use in the above-described coating preparation, for example, a kneading device such as a continuous twin screw kneader (extruder), continuous twin screw kneader capable of performing dilution at multiple stages, co-kneader, pressure kneader, roll kneader, or the like can be used, but is not particularly limited to these devices.

Moreover, as the dispersing device for use in the above-described coating preparation, for example, a dispersing device such as a roll mill, ball mill, horizontal type sand mill, vertical type sand mill, spike mill, pin mill, tower mill, pearl mill (such as a "DCP mill" manufactured by Maschinenfabrik Gustav Eirich GmbH & Co KG, for example), homogenizer, supersonic disperser, or the like can be used, but is not particularly limited to these devices.

Next, the coating for uneven layer formation is applied onto the surface of the base substance 11A and dried. As an application method, for example, a common application method such as gravure coating, extrusion coating, air doctor coating, reverse roll coating, or the like can be used. Next, the dried coating film is subjected to calendaring to smooth the surface. Accordingly, the uneven layer 17 is formed on the surface of the base substance 11A.

[2.3 Effect]

In the second embodiment, the uneven layer 17 for forming the microscopic uneven shape of the recording surface is provided between the base substance 11A and the crystal control layer 12. Thus, as the base substance 11A, a base substance having on the surface an uneven shape different from the unevenness of the recording surface, for example, a common base substance can be used to achieve both good recording and reproducing properties and low high-speed friction.

3 Third Embodiment

[3.1 Configuration of Magnetic Recording Medium]

Figure 4:
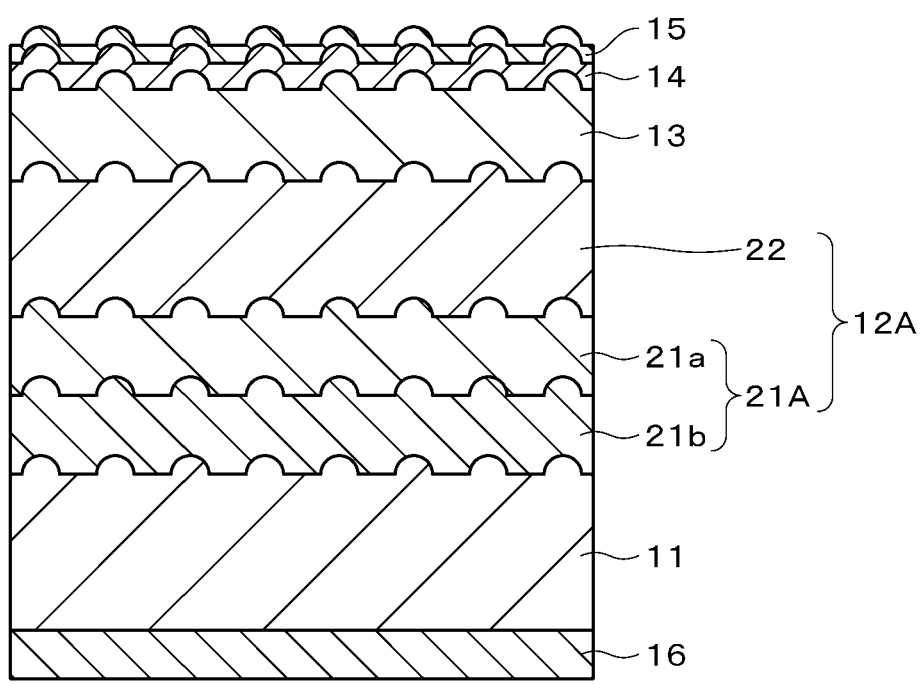
FIG. 4 is a cross sectional view schematically illustrating an example of the configuration of a magnetic recording medium according to a third embodiment of the present technique.

As illustrated in FIG. 4, a magnetic recording medium according to a third embodiment of the present technique is different from the magnetic recording medium according to the first embodiment in that a crystal control layer 12A having a seed layer 21A having a two-layer structure is provided. In the third embodiment, the same components are designated by the same reference numerals as those of the first embodiment and the description is omitted.

The seed layer 21A has a first seed layer (upper seed layer) 21a and a second seed layer (lower seed layer) 21b. The first seed layer 21a is provided on the foundation layer 22 side and the second seed layer 21b is provided on the base substance 11 side. For the second seed layer 21b, the same one as the seed layer 21 in the first embodiment can be used. The first seed layer 21a contains a material whose composition is different from that of the second seed layer 21b, for example. Specific examples of the material include NiW, Ta, or the like. The first seed layer 21a can also be regarded as an intermediate layer provided between the second seed layer 21b and the foundation layer 22 instead of a seed layer.

[3.2 Effect]

Due to the fact that the magnetic recording medium has the seed layer 21A having a two-layer structure, the orientation properties of the foundation layer 22 and the magnetic layer 13 can be further improved and the magnetic properties can be further improved.

4 Fourth Embodiment

Figure 5:
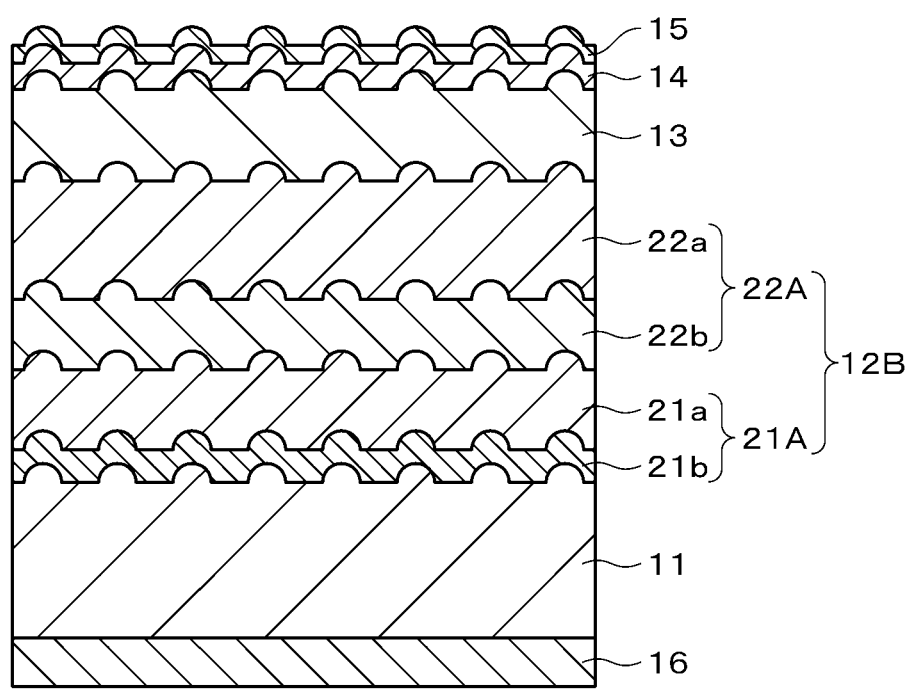
FIG. 5 is a cross sectional view schematically illustrating an example of the configuration of a magnetic recording medium according to a fourth embodiment of the present technique.

As illustrated in FIG. 5, a magnetic recording medium according to a fourth embodiment of the present technique is different from the magnetic recording medium according to the third embodiment in that a crystal control layer 12B having a foundation layer 22A having a two-layer structure is provided. In the fourth embodiment, the same components are designated by the same reference numerals as those of the third embodiment and the description is omitted.

The foundation layer 22A has a first foundation layer (upper foundation layer) 22a and a second foundation layer (lower foundation layer) 22b. The first foundation layer 22a is provided on the magnetic layer 13 side and the second foundation layer 22b is provided on the seed layer 21A side.

As materials of both the first foundation layer 22a and the second foundation layer 22b, the same materials as those of the foundation layer 22 in the first embodiment can be used. However, the first foundation layer 22a and the second foundation layer 22b are different in the target effects, and therefore the sputtering conditions of the layers are varied. More specifically, it is important for the first foundation layer 22a to have a film structure which promotes the granular structure of the magnetic layer 13 serving as the upper layer thereof and it is important for the second foundation layer 22b to have a film structure having high crystal orientation properties.

[4.2 Effect]

Due to the fact that the magnetic recording medium has the foundation layer 22A having a two-layer structure, the orientation properties and the granular constitutive property of the magnetic layer 13 can be further improved and the magnetic properties can be further improved.

[4.3 Modification]

In the magnetic recording medium according to the fourth embodiment, a seed layer having a single layer structure may be provided in place of the seed layer 21A having a two-layer structure. As the seed layer having a single layer structure, the seed layer 21 in the first embodiment can be used.

5 Fifth Embodiment

[5.1 Configuration of Magnetic Recording Medium]

Figure 6:
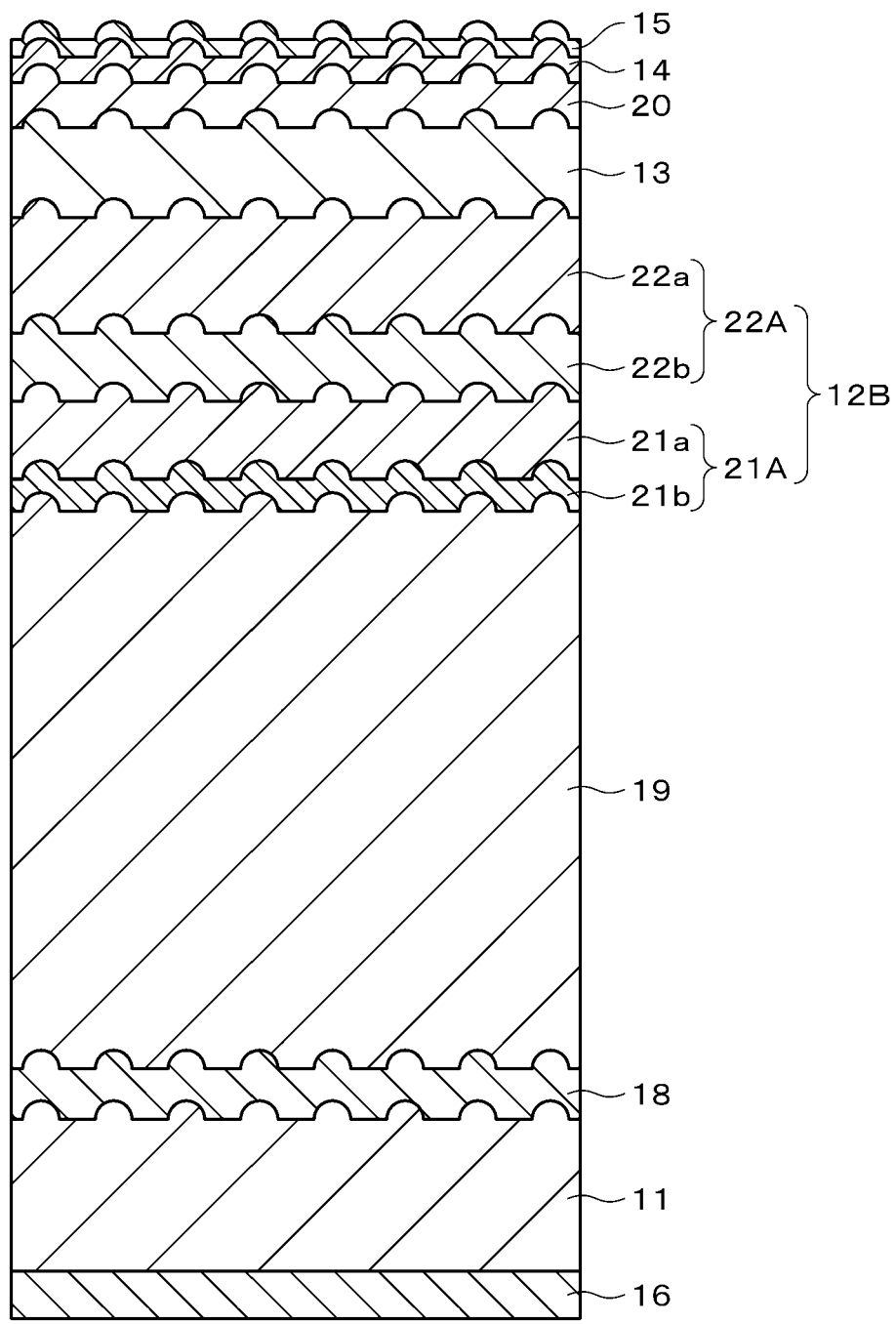
FIG. 6 is a cross sectional view schematically illustrating an example of the configuration of a magnetic recording medium according to a fifth embodiment of the present technique.

The magnetic recording medium according to this fifth embodiment of the present technique is a so-called two-layer vertical magnetic recording medium and is different from the magnetic recording medium according to the fourth embodiment in that a seed layer 18 and a soft magnetic underlayer (hereinafter referred to as "SUL") 19 are provided between the base substance 11 and the seed layer 21A as illustrated in FIG. 6. The seed layer 18 is provided on the base substance 11 side and the SUL 19 is provided on the seed layer 21A side. The magnetic recording medium according to this fifth embodiment is suitably used in a recording and reproducing device employing a single pole type (SPT) recording head and a tunnel magnetoresistive (TMR) type reproducing head. In the fifth embodiment, the same components are designated by the same reference numerals as those of the fourth embodiment and the description is omitted.

As the seed layer 18, the same one as the seed layer 21 in the first embodiment can be used.

The film thickness of the SUL 19 is preferably 40 nm or more and more preferably 40 nm or more and 140 nm or less. When the film thickness of the SUL 19 is 40 nm or more, better recording and reproducing properties can be obtained. On the other hand, when the film thickness of the SUL 19 is 140 nm or less, it is possible to suppress a reduction in crystal orientation properties of the foundation layer 22A due to coarsening of crystal particles of the SUL 19 and to avoid extending the film formation time of the SUL 19 and causing a reduction in productivity. The SUL 19 contains a soft magnetic material of an amorphous state. As the soft magnetic material, Co materials, Fe materials, or the like can be used, for example. Examples of the Co materials include CoZrNb, CoZrTa, CoZrTaNb, and the like, for example. Examples of the Fe materials include FeCoB, FeCoZr, FeCoTa, and the like, for example.

Since the SUL 19 has an amorphous state, the SUL 19 does not have a role of promoting the epitaxial growth of a layer to be formed on the SUL 19 but is desired not to disturb the crystal orientation of the foundation layer 22 to be formed on the SUL 19. To that end, it is necessary for the SUL 19 to have a microscopic structure in which the soft magnetic material does not form a column. However, when the influence of degassing of moisture or the like from the base substance 11 is large, the soft magnetic material is coarsened and disturbs the crystal orientation of the foundation layer 22A to be formed on the SUL 19. In order to suppress the influence thereof, it is preferable to provide the seed layer 18 on the surface of the base substance 11. In particular, when a film containing a polymer material to which a large amount of moisture and gas, such as oxygen, adsorb is used as the base substance 11, it is preferable to provide the seed layer 18 in order to suppress the influence thereof.

It is preferable to further have a CAP layer (stack layer) 20 between the magnetic layer 13 and the protective layer 14. The lamination structure having the magnetic layer 13 having the granular structure and the CAP layer 20 is generally referred to as coupled granular continuous (CGC) structure. The film thickness of the CAP layer 20 is preferably 4 nm or more and 12 nm or less. By selecting the film thickness of the CAP layer 20 in the range of 4 nm or more and 12 nm or less, better recording and reproducing properties can be obtained. A CoCrPt material is contained. Examples of the CoCrPt material include CoCrPt, CoCrPtB, materials (CoCrPt-metal oxide, CoCrPtB-metal oxide) obtained by further adding metal oxide to CoCrPt and CoCrPtB, and the like, for example. As the metal oxide to be added, at least one kind selected from the group consisting of Si, Ti, Mg, Ta, Cr, and the like can be used, for example. Specific examples thereof include $SiO_2$, $TiO_2$, MgO, $Ta_2O_5$, $Cr_2O_3$, a mixture of two or more kinds thereof, and the like.

In the magnetic recording medium according to the fifth embodiment, it is preferable that the seed layer 18, the SUL 19, the first and second seed layers 21a and 21b, the first and second foundation layers 22a and 22b, and the magnetic layer 13 are all continuously formed by a Roll to Roll method. This is because the magnetic properties and the recording and reproducing properties can be further improved.

[5.2 Effect]

In the magnetic recording medium according to the fifth embodiment, by providing the SUL 19 under the magnetic layer 13 which is a vertical magnetic layer, the SUL 19 plays a role of reducing the generation of a magnetic pole in the top layer of the magnetic recording layer 13 to suppress a demagnetizing field caused by the generation of a magnetic pole and also guiding a head magnetic flux into the SUL 19 to assist the generation of a sharp head magnetic field. Moreover, since the seed layer 18 is provided between the base substance 11 and the SUL 19, the coarsening of the soft magnetic material contained in the SUL 19 can be suppressed. More specifically, the disorder of the crystal orientation in the foundation layer 22A can be suppressed. Therefore, in the magnetic recording medium having a surface recording density higher than that of the first embodiment, good recording and reproducing properties can be realized.

When a structure in which the CAP layer 20 is provided on the magnetic layer 13 having the granular structure is adopted, magnetic coupling due to exchange interaction is generated between the magnetic layer 13 and the CAP layer 20, and then the inclination of a M-H loop around Hc is steepened due to the effect, so that recording can be easily performed. In usual, when the inclination of the M-H loop is steepened only by the magnetic layer 13, an increase in noise is observed. However, in the case of this structure, a recording structure involving noise generation can maintain a low noise structure, and therefore a structure in which the noise is low and recording is easily performed can be realized.

[5.3 Modification]

In the magnetic recording medium according to the fifth embodiment, a seed layer having a single layer structure may be provided in place of the seed layer 21A having a two-layer structure. As the seed layer having a single layer structure, the seed layer 21 in the first embodiment can be used. A foundation layer having a single layer structure may be provided in place of the foundation layer 22A having a two-layer structure. As the foundation layer having a single layer structure, the foundation layer 22 in the first embodiment can be used.

6 Sixth Embodiment

[6.1 Configuration of Magnetic Recording Medium]

Figure 7:
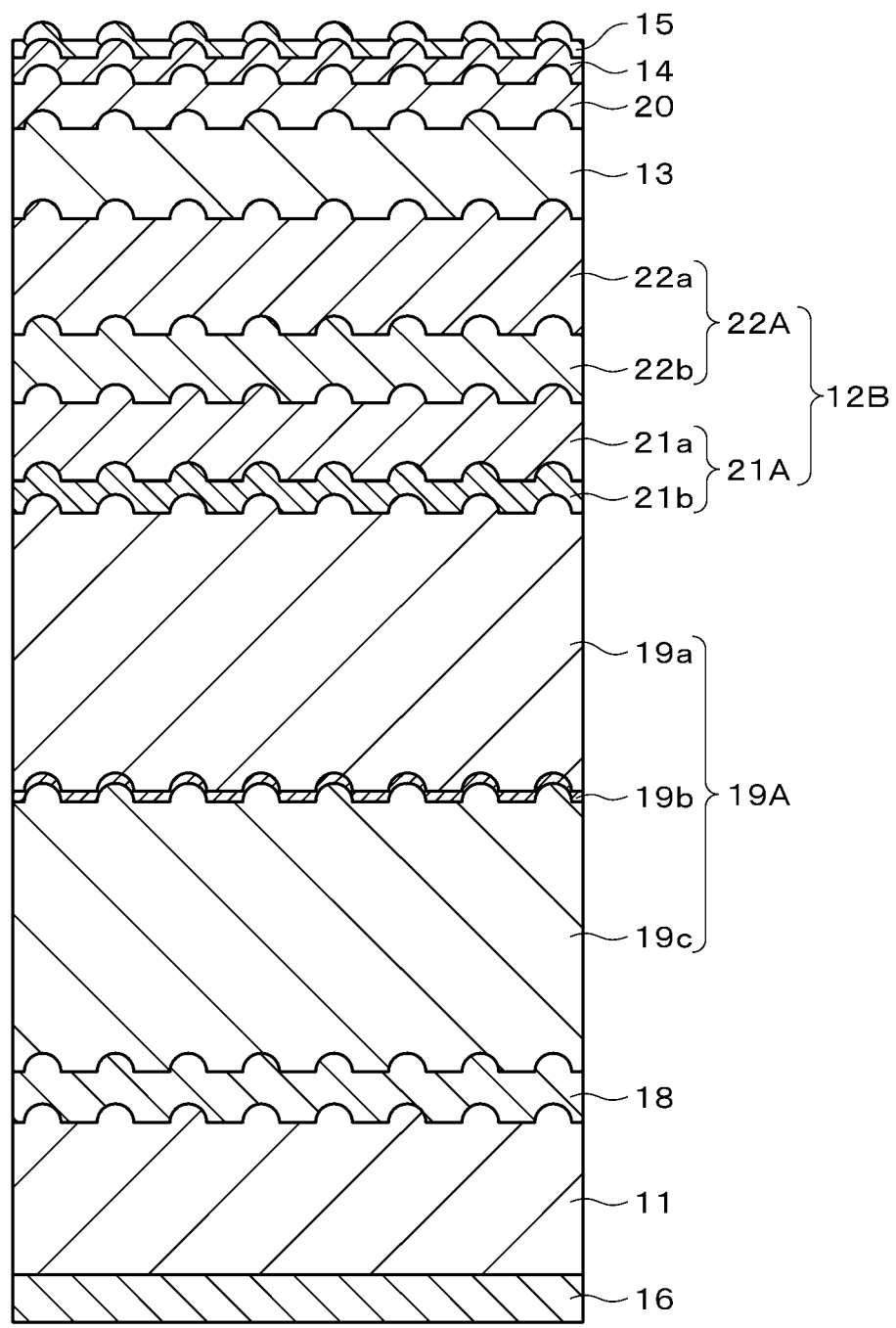
FIG. 7 is a cross sectional view schematically illustrating an example of the configuration of a magnetic recording medium according to a sixth embodiment of the present technique.

The magnetic recording medium according to this sixth embodiment is different from the magnetic recording medium according to the fifth embodiment in that an antiparallel coupled SUL (hereinafter referred to as "APC-SUL") 19A is provided as illustrated in FIG. 7. In the sixth embodiment, the same components are designated by the same reference numerals as those of the fifth embodiment and the description is omitted.

The APC-SUL 19A has a structure in which two soft magnetic layers 19a and 19c are laminated through a thin intermediate layer 19b, and magnetization is positively coupled in an antiparallel manner utilizing the exchange coupling through the intermediate layer 19b. The film thickness of each of the soft magnetic layers 19a and 19c is preferably almost the same. The total film thickness of the soft magnetic layers 19a and 19c is preferably 40 nm or more and more preferably 40 nm or more and 140 nm or less. When the total film thickness is 40 nm or more, better recording and reproducing properties can be obtained. On the other hand, when the total film thickness is 140 nm or less, it is possible to avoid extending the film formation time of the APC-SUL 19A and causing a reduction in productivity. Materials of the soft magnetic layers 19a and 19c are preferably the same. As the material, the same materials as those of the SUL 19 in the fifth embodiment can be used. The film thickness of the intermediate layer 19b is, for example, 0.8 nm or more and 1.4 nm or less, preferably 0.9 nm or more and 1.3 nm or less, and more preferably about 1.1 nm. By selecting the film thickness of the intermediate layer 19b in the range of 0.9 nm or more and 1.3 nm or less, better recording and reproducing properties can be obtained. As the material of the intermediate layer 19b, V, Cr, Mo, Cu, Ru, Rh, and Re are mentioned and Ru is particularly preferably contained.

[6.2 Effect]

In the magnetic recording medium according to the sixth embodiment, since the APC-SUL 19A is used, the soft magnetic layer 19a which is an upper layer portion and the soft magnetic layer 19c which is a lower layer portion are exchange-coupled in an antiparallel manner and the total magnetization of the upper and lower layers is zero in the residual magnetization state. Thus, the generation of spike-like noise, which is generated when the magnetic domain in the APC-SUL 19A moves, can be suppressed. Therefore, the recording and reproducing properties can be further improved.

[6.3 Modification]

In the magnetic recording medium according to the sixth embodiment, a seed layer and/or a foundation layer having a single layer structure may be provided in the same manner as in the magnetic recording medium according to the modification of the fifth embodiment.

7 Seventh Embodiment

[7.1 Configuration of Magnetic Recording Medium]

Figure 13:
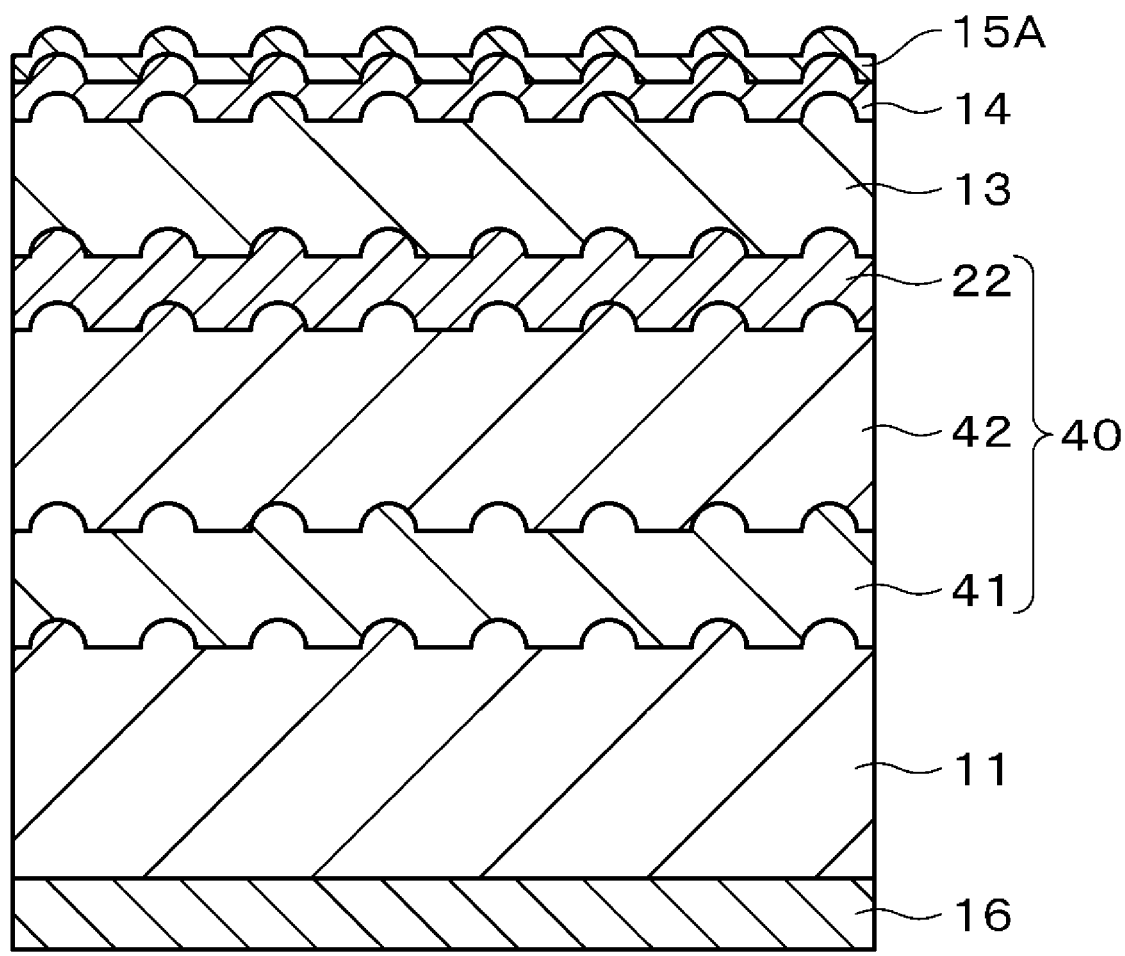
FIG. 13 is a cross sectional view schematically illustrating an example of the configuration of a magnetic recording medium according to a seventh embodiment of the present technique.

A magnetic recording medium according to a seventh embodiment of the present technique is different from the magnetic recording medium according to the first embodiment in that a crystal control layer 40 and a lubricant layer 15A are provided as illustrated in FIG. 13 in place of the crystal control layer 12 and the lubricant layer 15 (see FIG. 1). In the seventh embodiment, the same components are designated by the same reference numerals as those of the first embodiment and the description is omitted.

The crystal control layer 40 includes a seed layer (first layer) 41 provided on the surface of the base substance 11, an intermediate layer (second layer) 42 provided on the seed layer 41, and the foundation layer (third layer) 22 provided on the intermediate layer 42.

(Seed Layer)

The seed layer 41 contains Cr, Ni, and Fe, and has a face-centered cubic lattice (fcc) structure, which is preferentially oriented such that a (111) plane of this face-centered cubic structure becomes in parallel with the surface of the base substance 11. Here, preferential orientation refers to a state in which, in a θ-2θ scan of an X-ray diffraction method, a diffraction peak intensity from the (111) plane of the face-centered cubic lattice structure is higher than a diffraction peak from another crystal surface or a state in which, in the θ-2θ scan of the X-ray diffraction method, only a diffraction peak intensity from the (111) plane of the face-centered cubic lattice structure is observed.

From the viewpoint of improving SNR, the X-ray diffraction intensity ratio in the seed layer 41 is preferably 60 cps/nm or more, more preferably 70 cps/nm or more, and still more preferably 80 cps/nm or more. Here, the X-ray diffraction intensity ratio in the seed layer 41 is a value (I/D (cps/nm)) determined by dividing the X-ray diffraction intensity I(cps) in the seed layer 41 by a thickness D (nm) of the seed layer 41.

It is preferable that Cr, Ni, and Fe contained in the seed layer 41 have an average composition expressed by the following expression (A):

$$Cr_X(Ni_YFe_{100-Y})_{100-X} \quad (A)$$

(where X is in the range of $10 \leq X \leq 45$, and Y is in the range of $60 \leq Y \leq 90$).

If X falls outside the above-described range, the (111) orientation of the face-centered cubic lattice structure of Cr, Ni, and Fe tends to be reduced to deteriorate SNR. Similarly, if Y falls outside the above-described range, the (111) orientation of the face-centered cubic lattice structure of Cr, Ni, and Fe tends to be reduced to deteriorate SNR.

It is preferable that the thickness of the seed layer 41 is 5 nm or more and 40 nm or less. If the thickness of the seed layer 41 falls outside this range, the (111) orientation of the face-centered cubic lattice structure of Cr, Ni, and Fe tends to be reduced to deteriorate SNR. Note that in the present specification, the thickness of each layer, such as the seed layer 41, is measured as described below. First, a magnetic recording medium is processed thin in a direction of its film cross section to make a sample piece. Next, the sample piece is observed by a transmission electron microscope (hereinafter referred to as "TEM"), and the thickness of each layer, such as the seed layer 41, is measured from the TEM image.

(Intermediate Layer)

The intermediate layer 42 contains Co and O having a face-centered cubic lattice structure, and has a column (columnar crystal) structure. With the intermediate layer 42 containing Co and O, effects (functions) substantially similar to those of the foundation layer 22 containing Ru are obtained. A concentration ratio of an average atomic concentration of O to an average atomic concentration of Co ((average atomic concentration of O)/(average atomic concentration of Co)) is O or more. If the concentration ratio is less than 1, the effect of providing the intermediate layer 42 tends to be reduced to deteriorate SNR.

It is preferable that the column structure is inclined from the viewpoint of improving SNR. It is preferable that the direction of inclination is the longitudinal direction of the magnetic recording medium having a long shape. The reason why the longitudinal direction is preferable in this manner is as follows. The magnetic recording medium according to the present embodiment is a magnetic recording medium for so-called linear recording, and a recording track is in parallel with the longitudinal direction of the magnetic recording medium. Moreover, the magnetic recording medium according to the present embodiment is also a so-called vertical magnetic recording medium, and from the viewpoint of recording properties, it is preferable that the crystal orientation axis of the magnetic layer 13 extends in the vertical direction, whilst the crystal orientation axis of the magnetic layer 13 may be inclined by the influence of the inclination of the column structure of the intermediate layer 42. In the magnetic recording medium for linear recording, in relation to a head magnetizing field during recording, a structure in which the crystal orientation axis of the magnetic layer 13 is inclined in the longitudinal direction of the magnetic recording medium can reduce an influence on the recording properties due to the inclination of the crystal orientation axis, as compared with a structure in which the crystal orientation axis of the magnetic layer 13 is inclined in the width direction of the magnetic recording medium. In order to incline the crystal orientation axis of the magnetic layer 13 in the longitudinal direction of the magnetic recording medium, it is preferable that the direction of inclination of the column structure of the intermediate layer 42 is the longitudinal direction of the magnetic recording medium as described above.

It is preferable that an inclination angle of the column structure is preferably more than 0° and 60° or less. When the inclination angle is in the range of more than 0° and 60° or less, a change in edge shape of the column included in the intermediate layer 42 is so great that a nearly pyramidal shape is obtained, and thus, the effect of the granular structure tends to be increased, noise tends to be reduced, and SNR tends to be improved. On the other hand, if the inclination angle exceeds 60°, a change in edge shape of the column included in the intermediate layer 42 is so small that a nearly pyramidal shape is unlikely to be obtained, and thus, the low noise effect tends to diminish.

The average particle size of the column structure is 3 nm or more and 13 nm or less. If the average particle size is less than 3 nm, the average particle size of the column structure included in the magnetic layer 13 decreases, and thus, with existing magnetic materials, the record keeping capacity tends to be significantly reduced. On the other hand, if the average particle size exceeds 13 nm, noise tends to increase and SNR tends to be reduced.

It is preferable that the thickness of the intermediate layer 42 is 10 nm or more and 150 nm or less. If the thickness of the intermediate layer 42 is less than 10 nm, the (111) orientation of the face-centered cubic lattice structure of the intermediate layer 42 tends to be reduced. On the other hand, if the thickness of the intermediate layer 42 exceeds 150 nm, the particle size of the column increases and noise increases, and thus, SNR tends to be reduced.

(Concentration Ratio of O and Co Atoms)

The concentration ratio of an average atomic concentration of O to an average atomic concentration of Co is determined as described below. First, by subjecting the magnetic recording medium to ion milling and performing a depth-direction analysis of the intermediate layer 42 through auger electron spectroscopy (AES), the average atomic concentration (at (atomic) %) of each of Co and O atoms in the depth direction is determined. Next, the concentration ratio of the average atomic concentration of Co atoms to the average atomic concentration of O atoms ((the average atomic concentration of Co atoms)/(the average atomic concentration of O atoms)) is determined.

(Average Particle Size)

The average particle size of the column structure is determined as described below. First, layers from the surface of the magnetic recording medium to the foundation layer 22 are removed by ion milling, and layers from the rear surface side of the magnetic recording medium to the seed layer 41 are removed by ion milling. Next, the remaining film piece is observed by TEM, and 100 particles are selected at random from the TEM image to determine an area S of each particle. Next, assuming that the cross sectional shape of particles is circular, the particle size (diameter) R of each particle is determined from the following expression.

$$R = 2 \times (S/\pi)^{1/2}$$

Next, the determined particle sizes of the 100 particles are simply averaged (arithmetic mean) to determine the average particle size of the column.

(Inclination Angle of Column)

The inclination angle of the column structure is determined as described below. First, the magnetic recording medium is processed thin in a direction of its film cross section to make a sample piece. Next, the sample piece is observed by TEM, and the inclination angle of the column of the intermediate layer 42 is measured from the TEM image. Here, the inclination angle is an angle measured using a surface (interface) of the intermediate layer 42 on the seed layer 41 side as a reference) (0°).

(X-Ray Diffraction Intensity Ratio)

First, (θ-2θ) properties are measured in a film slope of the magnetic recording medium. Next, a value (I/D) obtained by dividing a peak intensity I of 2θ:44° (Ni fcc ((111) plane)) by the thickness D of the seed layer 41 is determined as an X-ray diffraction intensity ratio. Note that the thickness of the seed layer 41 has been determined by observing the made sample piece by TEM as described above.

Table 3 shows measuring conditions of X-ray diffraction intensity.

TABLE 3

| | Tohoku Ryokka Rigaku RINT 2000 |
|---|---|
| X-ray source | |
| Tube voltage | |
| Tube current | |
| Scanning axis | |
| Measuring method | Continuous |
| Count unit | |
| Start angle | |
| End angle | |
| Sampling width | |
| Scanning speed | |
| Divergence slit | |
| Divergence vertical restriction slit | |
| Scattering slit | |
| Light receiving slit | |
| Offset angle | |
| hkl | |
| BG conditions | Low angle |
| | Counting time 180 sec |
| | High angle |
| | Counting time 180 sec |
| Control fixed position | Fixed at 0° |
| Detector | High-speed sensitive detector |

Note
that as data processing software, appendix peak search software and XRD analysis software JADE can be used.

(Lubricant Layer)

The lubricant layer 15A contains at least one lubricant. The lubricant layer 15A may further contain various additives, for example, a corrosion inhibitor according to necessity. The lubricant has at least two carboxyl groups and one ester bond, and contains at least one carboxylic acid-based compound expressed by the following general formula (1). The lubricant may further contain a lubricant of a type other than the carboxylic acid-based compound expressed by the following general formula (1).

[Chem. 1]

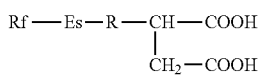

General formula (1)

(In the expression, Rf is an unsubstituted or substituted and saturated or unsaturated fluorine-containing hydrocarbon group or hydrocarbon group, Es is an ester bond, and R is not indispensable but is an unsubstituted or substituted and saturated or unsaturated hydrocarbon group.)

The above-described carboxylic acid-based compound is preferably expressed by the following general formula (2) or (3).

[Chem. 2]

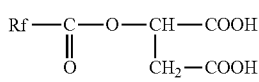

General formula (2)

(In the expression, Rf is an unsubstituted or substituted and saturated or unsaturated fluorine-containing hydrocarbon group or hydrocarbon group.)

[Chem. 3]

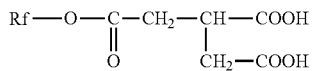

General formula (3)

(In the expression, Rf is an unsubstituted or substituted and saturated or unsaturated fluorine-containing hydrocarbon group or hydrocarbon group.)

It is preferable that the lubricant contains one or both of the carboxylic acid-based compounds expressed by the above general formulas (2) and (3).

When the lubricant containing the carboxylic acid-based compound expressed by the general formula (1) is applied onto the magnetic layer 13, the protective layer 14, or the like, a lubricating effect appears because of a cohesive force between fluorine-containing hydrocarbon groups or hydrocarbon groups Rf which are hydrophobic groups. In a case where the Rf group is the fluorine-containing hydrocarbon group, it is preferable that the total number of carbon atoms is 6 to 50 and the total number of carbon atoms of fluorinated hydrocarbon group is 4 to 20. The Rf group may be saturated or unsaturated, straight-chain or branched-chain, or cyclic, but it is particularly preferable that the Rf group is saturated and straight-chain.

For example, in a case where the Rf group is a hydrocarbon group, it is desirable that the Rf group is a group expressed by the following general formula (4).

[Chem. 4]

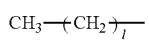

General formula (4)

(In the general formula (4), l is an integer selected from the range of 8 to 30, more desirably 12 to 20.)

Moreover, in a case where the Rf group is a fluorine-containing hydrocarbon group, it is desirable that the Rf group is a group expressed by the following general formula (5).

[Chem. 5]

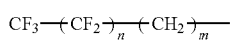

General formula (5)

(In the general formula (5), m and n are integers respectively selected from the following ranges: m=2 to 20 and n=3 to 18, more desirably m=4 to 13 and n=3 to 10.)

The fluorinated hydrocarbon groups may be concentrated at one place as described above, or may be distributed as in the following general formula (6), and may be —$CHF_2$, —CHF—, or the like, not only —$CF_3$ or —$CF_2$—.

General formula (6)

[Chem. 6]

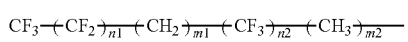

(In the general formula (6), n1+n2=n and m1+m2=m hold.)

The reason why the number of carbon atoms is limited in the general formulas (4), (5), and (6) as described above is because, when the number of carbon atoms (1, or the sum of m and n) constituting an alkyl group or a fluorine-containing alkyl group is the above-described lower limit or more, that length will be an appropriate length, so that a cohesive force between hydrophobic groups is exerted effectively, a good lubricating effect appears, and friction and wear durability is improved. In addition, it is because, when that number of carbon atoms is the above-described upper limit or less, solubility of the lubricant composed of the above-described carboxylic acid-based compound in a solvent is kept favorably.

In particular, when containing fluorine atoms, the Rf group is effective at reducing a coefficient of friction, and further at improving running properties, and the like. However, it is preferred to provide a hydrocarbon group between the fluorine-containing hydrocarbon group and the ester bond to separate the fluorine-containing hydrocarbon group and the ester bond, so that stability of the ester bond is ensured and hydrolysis is prevented.

Moreover, the Rf group may have a fluoroalkyl ether group or a perfluoropolyether group.

Although the R group is not indispensable, but if any, a hydrocarbon chain having a relatively small number of carbon atoms is preferred.

Furthermore, the Rf group or the R group contains elements, such as nitrogen, oxygen, sulfur, phosphorus, and halogen, as constituent elements, and in addition to the already-described functional group, may further has a hydroxyl group, carboxyl group, carbonyl group, amino group, ester bond, or the like.

It is preferable that the carboxylic acid-based compound expressed by the general formula (1) is specifically at least one of the following compounds. That is, it is preferable that the lubricant contains at least one of the following compounds:

$CF_3(CF_2)_7(CH_2)_{10}COOCH(COOH)CH_2COOH$
$CF_3(CF_2)_3(CH_2)_{10}COOCH(COOH)CH_2COOH$
$C_{17}H_{35}COOCH(COOH)CH_2COOH$
$CF_3(CF_2)_7(CH_2)_2OCOCH_2CH(C_{18}H_{37})COOCH(COOH)CH_2COOH$
$CF_3(CF_2)_7COOCH(COOH)CH_2COOH$
$CHF_2(CF_2)_7COOCH(COOH)CH_2COOH$
$CF_3(CF_2)_7(CH_2)_2OCOCH_2CH(COOH)CH_2COOH$
$CF_3(CF_2)_7(CH_2)_6OCOCH_2CH(COOH)CH_2COOH$
$CF_3(CF_2)_7(CH_2)_{11}OCOCH_2CH(COOH)CH_2COOH$
$CF_3(CF_2)_3(CH_2)_6OCOCH_2CH(COOH)CH_2COOH$
$C_{18}H_{37}OCOCH_2CH(COOH)CH_2COOH$
$CF_3(CF_2)_7(CH_2)_4COOCH(COOH)CH_2COOH$
$CF_3(CF_2)_3(CH_2)_4COOCH(COOH)CH_2COOH$
$CF_3(CF_2)_3(CH_2)_7COOCH(COOH)CH_2COOH$
$CF_3(CF_2)_9(CH_2)_{10}COOCH(COOH)CH_2COOH$
$CF_3(CF_2)_7(CH_2)_{12}COOCH(COOH)CH_2COOH$
$CF_3(CF_2)_5(CH_2)_{10}COOCH(COOH)CH_2COOH$
$CF_3(CF_2)_7CH(C_9H_{19})CH_2CH=CH(CH_2)_7COOCH(COOH)CH_2COOH$
$CF_3(CF_2)_7CH(C_6H_{13})(CH_2)_7COOCH(COOH)CH_2COOH$
$CH_3(CH_2)_3(CH_2CH_2CH(CH_2CH_2(CF_2)_9CF_3))_2(CH_2)_7COOCH(COOH)CH_2COOH$.

The carboxylic acid-based compound expressed by the general formula (1) has an advantage in solubility in a non-fluorinated solvent that imposes less load on the environment so that operations such as coating, immersion, spraying, and the like can be performed using a general-purpose solvent such as a hydrocarbon solvent, ketone-based solvent, alcohol-based solvent, ester-based solvent, or the like. Specific examples include solvents such as hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, cyclohexanone, and the like.

In a case where the protective layer 14 contains a carbon material, and when the above-described carboxylic acid-based compound is applied as a lubricant onto the protective layer 14, two carboxyl groups and at least one ester bond group which are polar bases of lubricant molecules are adsorbed onto the protective layer 14, and the lubricant layer 15A having particularly good durability can be formed because of a cohesive force between hydrophobic groups.

Note that the lubricant is not only held on the surface of the magnetic recording medium as the lubricant layer 15A as described above, but also may be contained and retained in layers such as the magnetic layer 13 and the protective layer 14 constituting the magnetic recording medium.

[7.2 Effect]

The magnetic recording medium according to the above-described seventh embodiment includes the seed layer 41 and the intermediate layer 42 between the base substance 11 and the foundation layer 22. The seed layer 41 contains Cr, Ni, and Fe, and has a face-centered cubic lattice (fcc) structure, which is preferentially oriented such that a (111) plane of this face-centered cubic structure is in parallel with the surface of the base substance 11. The intermediate layer 42 contains Co and O, and has a column structure in which the ratio of an average atomic concentration of O to an average atomic concentration of Co is 1 or more, and the average particle size is 3 nm or more and 13 nm or less. Accordingly, the foundation layer 22 can be reduced in thickness, and the magnetic layer 13 having good crystal orientation and high coercivity can be realized using Ru which is an expensive material as little as possible. Therefore, a magnetic recording medium having a high SNR can be provided.

Ru contained in the foundation layer 22 has the same hexagonal close-packed structure as that of Co which is a primary component of the magnetic layer 13. Thus, Ru has an effect of achieving both improvement in crystal orientation properties of the magnetic layer 13 and promotion of granular properties. Moreover, in order to further improve the crystal orientation of Ru contained in the foundation layer 22, the intermediate layer 42 and the seed layer 41 are provided under the foundation layer 22. In the magnetic recording medium according to the seventh embodiment, effects (functions) substantially similar to those of the foundation layer 22 containing Ru are achieved by the intermediate layer 42 containing inexpensive CoO having a face-centered cubic lattice structure. Thus, the foundation layer 22 can be reduced in thickness. Furthermore, in order to improve the crystal orientation of the intermediate layer 42, the seed layer 41 containing Cr, Ni, and Fe is provided.

[7.3 Modification]

Figure 14:
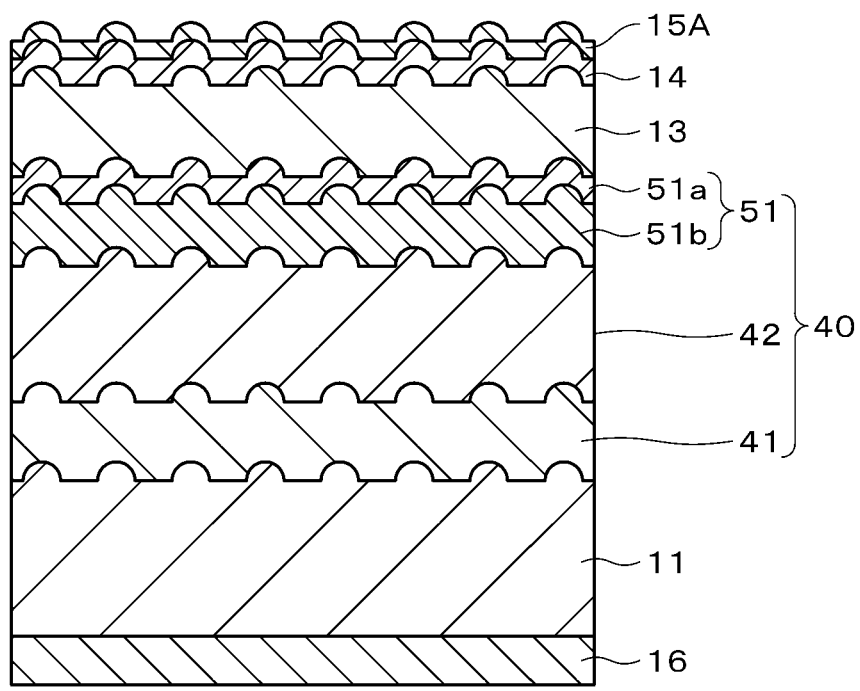
FIG. 14 is a cross sectional view schematically illustrating an example of the configuration of a magnetic recording medium according to a modification of the seventh embodiment of the present technique.

The magnetic recording medium may include a foundation layer 51 having a two-layer structure on the intermediate layer 42 as illustrated in FIG. 14. The foundation layer 51 includes a first foundation layer (upper foundation layer) 51*a* and a second foundation layer (lower foundation layer) 51*b*. The first foundation layer 51*a* is provided on the magnetic layer 13 side, and the second foundation layer 51*b* is provided on the intermediate layer 42 side. The first foundation layer 51*a* is similar to the intermediate layer 22 in the above-described first embodiment. The second foundation layer 51*b* contains NiW, NiWZr, NiWAl, or Ta, for example.

The modification of the first embodiment may be applied to the magnetic recording medium according to the seventh embodiment.

The magnetic recording medium according to the seventh embodiment may further include the uneven layer 17 provided between the base substance 11 and the crystal control layer 40 as in the second embodiment. In this case, the uneven surface (surface) of the base substance 11 has an uneven shape totally different from the unevenness of the recording surface.

The magnetic recording medium according to the seventh embodiment may further include the SUL 19 between the base substance 11 and the crystal control layer 40 as in the fifth embodiment, or may further include the APC-SUL 19A between the base substance 11 and the crystal control layer 40 as in the sixth embodiment.

In the above-described seventh embodiment, the case in which the seed layer 41, the intermediate layer 42, and the foundation layer 22 constitute the crystal control layer 40 has been described, whilst the seed layer 41 and the foundation layer 22 may constitute the crystal control layer 40.

The magnetic recording media according to the first to sixth embodiments may include the lubricant layer 15A in the seventh embodiment in place of the lubricant layer 15.

EXAMPLES

Hereinafter, the present technique will be specifically described with reference to examples, whilst the present technique is not limited to these examples alone.

Example 1

First, as a polymer film, a polyethylene terephthalate film (hereinafter referred to as a "PET film") whose film thickness is 5.0 μm, having the average surface roughness SRa as well as the number of projections having a height of 7.5 nm or more and the number of projections having a height of 15 nm or more included in a unit region on a surface substantially similar to those of a recording surface of Example 1 to be finally obtained (see Table 2) was prepared.

Next, a crystal control layer, a magnetic layer, and a protective layer were formed successively on the surface of the prepared PET film in a manner as to conform to the microscopic uneven shape of the surface. Accordingly, a recording surface substantially maintaining the microscopic uneven shape of the surface of the PET film was obtained. Next, a backcoat layer was formed on the rear surface of the PET film. Next, a lubricant was applied onto the protective layer to form a lubricant layer on the protective layer. Accordingly, a wide magnetic tape was obtained. Next, the wide magnetic tape was trimmed into a width of ½ inch (12.65 mm) to obtain an intended magnetic tape (magnetic recording medium).

The crystal control layer was formed by laminating a first TiCr seed layer, a first soft magnetic layer, an Ru intermediate layer, a second soft magnetic layer, a second TiCr seed layer, an NiW seed layer, a first Ru foundation layer, and a second Ru foundation layer in this order on the surface of the PET film. The respective layers constituting the crystal control layer, the magnetic layer, the protective layer, and the backcoat layer were formed as described below.
(Film Formation Process of First TiCr Seed Layer)
First, a TiCr seed layer was formed with a thickness of 5 nm on the surface of the PET film as a nonmagnetic base substance under the following film formation conditions:
Sputtering method: DC magnetron sputtering method
Target: $Ti_{50}Cr_{50}$ target
Ultimate vacuum: $5\times10^{-5}$ Pa
Gas type: Ar
Gas pressure: 0.5 Pa.
(Film Formation Process of First Soft Magnetic Layer)
First, a CoZrNb layer was formed with a thickness of 20 nm as a first soft magnetic layer on the TiCr seed layer under the following film formation conditions: Sputtering method: DC magnetron sputtering method
Target: CoZrNb target
Gas type: Ar
Gas pressure: 0.1 Pa.
(Film Formation Process of Ru Intermediate Layer)
Next, an Ru intermediate layer was formed with a thickness of 1.1 nm on the CoZrNb layer under the following film formation conditions:
Target: Ru target
Gas type: Ar
Gas pressure: 0.3 Pa.
(Film Formation Process of Second Soft Magnetic Layer)
Next, a CoZrNb layer was formed with a thickness of 20 nm as a second soft magnetic layer on the Ru intermediate layer under the following film formation conditions: Sputtering method: DC magnetron sputtering method
Target: CoZrNb target
Gas type: Ar
Gas pressure: 0.1 Pa.
(Film Formation Process of Second TiCr Seed Layer)
Next, a second TiCr seed layer was formed with a thickness of 2.5 nm on the CoZrNb layer under the following film formation conditions:
Sputtering method: DC magnetron sputtering method
Target: $Ti_{50}Cr_{50}$ target
Ultimate vacuum: $5\times10^{-5}$ Pa
Gas type: Ar
Gas pressure: 0.5 Pa.
(Film Formation Process of NiW Seed Layer) Next, a NiW seed layer was formed with a thickness of 10 nm on the second
TiCr seed layer under the following film formation conditions: Sputtering method: DC magnetron sputtering method
Target: NiW target
Ultimate vacuum: $5\times10^{-5}$ Pa
Gas type: Ar
Gas pressure: 0.5 Pa.
(Film Formation Process of First Ru Foundation Layer)
Next, a first Ru foundation layer was formed with a thickness of 10 nm on the NiW seed layer under the following film formation conditions: Sputtering method: DC magnetron sputtering method
Target: Ru target
Gas type: Ar
Gas pressure: 0.5 Pa.
(Film Formation Process of Second Ru Foundation Layer)
Next, a second Ru foundation layer was formed with a thickness of 20 nm on the first Ru foundation layer under the following film formation conditions: Sputtering method: DC magnetron sputtering method
Target: Ru target
Gas type: Ar
Gas pressure: 1.5 Pa.
(Film Formation Process of Magnetic Layer)
Next, a (CoCrPt)—($SiO_2$) magnetic layer was formed with a thickness of 20 nm on the second Ru foundation layer under the following film formation conditions:

Sputtering method: DC magnetron sputtering method
Target: $(Co_{70}Cr_{15}Pt_{10})_{90}$—$(SiO_2)_{10}$ target
Gas type: Ar
Gas pressure: 1.5 Pa.
(Film Formation Process of Protective Layer)

Next, a protective layer containing carbon was formed with a thickness of 5 nm on the CoPtCrB layer under the following film formation conditions:
Sputtering method: DC magnetron sputtering method
Target: Carbon target
Gas type: Ar
Gas pressure: 1.0 Pa.
(Preparation Process of Coating for Backcoat Layer Formation)

Next, a coating for backcoat layer formation was prepared as described below. The following raw materials were mixed in an agitation tank provided with a disperser and subjected to filtering to prepare the coating for backcoat layer formation.
Carbon black (manufactured by ASAHI CARBON CO., LTD., product name: #80): 100 parts by mass
Polyester polyurethane: 100 parts by mass
(manufactured by Nippon Polyurethane Industry Co., Ltd., product name: N-2304)
Methyl ethyl ketone: 500 parts by mass
Toluene: 400 parts by mass
Cyclohexanone: 100 parts by mass.
(Film Formation Process of Backcoat Layer)

Next, by applying the coating for backcoat layer formation onto the rear surface of the PET film and drying, a backcoat layer having an average thickness of 0.6 μm was formed on the rear surface of the PET film.

Examples 2 to 5

First, a magnetic tape was obtained similarly to Example 1. Next, projections at the recording surface of the obtained magnetic tape were cut. Specifically, by causing a sputtering tape to reciprocate many times over a recording and reproducing head of a linear scanning data storage (Linear Tape-Open: LTO), the average surface roughness SRa of the recording surface, the number of projections having a height of 7.5 nm or more included in the unit region of the recording surface, and the number of projections having a height of 15 nm or more included in the unit region of the recording surface were adjusted to be those shown in Table 2.

Comparative Example 1

First, as a polymer film, a magnetic tape was obtained similarly to Example 1 except for preparing a PET film whose film thickness is 5.0 μm, having the average surface roughness SRa as well as the number of projections having a height of 7.5 nm or more and the number of projections having a height of 15 nm or more on the surface substantially similar to those of a recording surface of Comparative Example 1 to be finally obtained (see Table 2).

Examples 6 to 9, Comparative Examples 2 to 5

First, a magnetic tape was obtained similarly to Comparative Example 1. Next, projections at the recording surface of the obtained magnetic tape were cut. Specifically, by causing a sputtering tape to reciprocate many times over a recording and reproducing head of a linear scanning data storage, the average surface roughness SRa of the recording surface, the number of projections having a height of 7.5 nm or more included in the unit region of the recording surface, and the number of projections having a height of 15 nm or more included in the unit region of the recording surface were adjusted to be those shown in Table 2.

Example 10

First, as a polymer film, a PET film whose film thickness is 5.0 μm, having the average surface roughness SRa as well as the number of projections having a height of 7.5 nm or more and the number of projections having a height of 15 nm or more included in the unit region on the surface totally different from those of a recording surface of Example 10 to be finally obtained (see Table 2) was prepared. Specifically, a PET film similar to Comparative Example 1 was prepared.

Next, an uneven layer having the average surface roughness SRa as well as the number of projections having a height of 7.5 nm or more and the number of projections having a height of 15 nm or more included in the unit region on the surface substantially similar to those of the recording surface of Example 10 to be finally obtained (see Table 2) was formed on the surface of the prepared PET film. Next, a crystal control layer, a magnetic layer, and a protective layer were formed successively on the surface of the formed uneven layer in a manner as to conform to the microscopic uneven shape of the surface. Accordingly, a recording surface substantially maintaining the microscopic uneven shape of the surface of the uneven layer was obtained. Next, a backcoat layer was formed on the rear surface of the PET film. Next, a lubricant was applied onto the protective layer to form a lubricant layer on the protective layer. Accordingly, a wide magnetic tape was obtained. Next, the wide magnetic tape was trimmed into a width of ½ inch (12.65 mm) to obtain an intended magnetic tape (magnetic recording medium). Note that the respective thin films constituting the crystal control layer, the magnetic layer, the protective layer, and the backcoat layer were formed similarly to Example 1. In addition, the uneven layer as a coating layer was formed as described below.
(Preparation Process of Coating for Uneven Layer Formation)

First, a coating for uneven layer formation was prepared as described below. First, the following raw materials were kneaded in an extruder to obtain a kneaded material A1.
Acicular iron oxide powder: 100 parts by mass
($\alpha$-$Fe_2O_3$, an average major axis length of 0.10 μm)
Vinyl chloride-based resin: 55.6 parts by mass
(resin solution: 30 mass % of resin, 70 mass % of cyclohexanone)
Carbon black: 10 parts by mass
(an average particle size of 20 nm).

Next, the kneaded material A1 and the following raw materials were added in an agitation tank provided with a disperser to perform premixing. Thereafter, sand mill mixing was further performed, and filtering was performed to prepare a coating A2 for uneven layer formation.
Polyurethane-based resin UR8200 (manufactured by TOYOBO CO., LTD.): 18.5 parts by mass
Polyisocyanate: 4 parts by mass
(product name: Coronate L manufactured by Nippon Polyurethane Industry Co., Ltd.)
Methyl ethyl ketone: 108.2 parts by mass
Toluene: 108.2 parts by mass
Cyclohexanone: 18.5 parts by mass.
(Film Formation Process of Uneven Layer)

Next, the coating A2 for uneven layer formation was applied onto the surface of the prepared PET film such that the film thickness became 1.0 μm, drying was performed, and take-up was performed. After the take-up, hardening was performed at 60° C. for 20 hours, and then the surface of the coating film was smoothed by calendering (roll temperature: 100° C., a linear load of 100 kgf/cm). Accordingly, an uneven layer was formed on the surface of the PET film.

Example 11

A magnetic tape was obtained similarly to Example 10 except for forming an uneven layer as described below.
(Preparation Process of Coating for Uneven Layer Formation)
First, a coating for uneven layer formation was prepared as described below. First, the following raw materials were kneaded in an extruder to obtain a kneaded material B1.
Acicular iron oxide powder: 100 parts by mass
($\alpha$-$Fe_2O_3$, an average major axis length of 0.15 μm)
Vinyl chloride-based resin: 55.6 parts by mass
(resin solution: 30 mass % of resin, 70 mass % of cyclohexanone)
Carbon black: 10 parts by mass
(an average particle size of 20 nm).
Next, the kneaded material B1 and the following raw materials were added in an agitation tank provided with a disperser to perform premixing. Thereafter, sand mill mixing was further performed, and filtering was performed to prepare a coating B2 for uneven layer formation.
Polyurethane-based resin UR8200 (manufactured by TOYOBO CO., LTD.): 18.5 parts by mass
Polyisocyanate: 4 parts by mass
(product name: Coronate L manufactured by Nippon Polyurethane Industry Co., Ltd.)
Methyl ethyl ketone: 108.2 parts by mass
Toluene: 108.2 parts by mass
Cyclohexanone: 18.5 parts by mass.
(Film Formation Process of Uneven Layer)
Next, the coating B2 for uneven layer formation was applied onto the surface of the prepared PET film such that the film thickness became 1.0 μm, drying was performed, and take-up was performed. After the take-up, hardening was performed at 60° C. for 20 hours, and then the surface of the coating film was smoothed by calendering (roll temperature: 100° C., a linear load of 100 kgf/cm). Accordingly, an uneven layer was formed on the surface of the PET film.

Comparative Example 6

A magnetic tape was obtained similarly to Example 10 except for, after performing hardening at 60° C. for 20 hours after the take-up, smoothing the surface of the coating film by calendering (roll temperature: 100° C., a linear load of 80 kgf/cm).

Comparative Example 7

A magnetic tape was obtained similarly to Example 11 except for, after performing hardening at 60° C. for 20 hours after the take-up, smoothing the surface of the coating film by calendering (roll temperature: 100° C., a linear load of 80 kgf/cm).

Example 12

First, as a polymer film, a PET film similar to Comparative Example 1 was prepared. Next, a magnetic tape was obtained similarly to Example 1 except for successively forming a first soft magnetic layer, an Ru intermediate layer, a second soft magnetic layer, a seed layer, an intermediate layer, and a foundation layer on the polymer film as described below.
(Film Formation Process of First Soft Magnetic Layer)
First, a first soft magnetic layer containing CoZrNb was formed with a thickness of 50 nm on the surface of a long polymer film under the following film formation conditions:
Film formation method: DC magnetron sputtering method
Target: CoZrNb target
Gas type: Ar
Gas pressure: 0.1 Pa.
(Film Formation Process of Ru Intermediate Layer)
Next, an intermediate layer containing Ru was formed with a thickness of 1.0 nm on the first soft magnetic layer under the following film formation conditions: Film formation method: DC magnetron sputtering method
Target: Ru target
Gas type: Ar
Gas pressure: 0.3 Pa.
(Film Formation Process of Second Soft Magnetic Layer)
Next, a second soft magnetic layer containing CoZrNb was formed with a thickness of 50 nm on the intermediate layer under the following film formation conditions:
Film formation method: DC magnetron sputtering method
Target: CoZrNb target
Gas type: Ar
Gas pressure: 0.1 Pa.
(Film Formation Process of Seed Layer)
First, a seed layer containing $Cr_X(Ni_YFe_{100-Y})_{100-X}$ (where X=40, Y=81) was formed with a thickness of 10 nm on the second soft magnetic layer under the following film formation conditions:
Film formation method: DC magnetron sputtering method
Target: CrNiFe target
Gas type: Ar
Gas pressure: 0.25 Pa
Input power: 1.75 W/mm$^2$.
(Film Formation Process of Intermediate Layer)
Next, an intermediate layer containing CoO was formed with a thickness of 50 nm on the seed layer under the following film formation conditions: Film formation method: RF magnetron sputtering method
Target: CoO target
Gas type: Ar
Gas pressure: 1 Pa
Input power: 0.75 W/mm$^2$
Mask: none.
(Film Formation Process of Foundation Layer)
Next, a foundation layer containing Ru was formed with a thickness of 2 nm on the intermediate layer under the following film formation conditions: Film formation method: DC magnetron sputtering method
Target: Ru target
Gas type: Ar
Gas pressure: 0.5 Pa.
(Cutting Process)
Next, projections at the recording surfaces of the obtained magnetic tapes were cut. Specifically, by causing a sputtering tape to reciprocate many times over a recording and reproducing head of a linear scanning data storage, the average surface roughness SRa of the recording surface, the number of projections having a height of 7.5 nm or more included in the unit region of the recording surface, and the number of projections having a height of 15 nm or more included in the unit region of the recording surface were adjusted to be those shown in Table 2.

The magnetic tapes of Examples 1 to 12 and Comparative Examples 1 to 7 obtained as described above were subjected to the following evaluations.

(Arithmetic Average Roughness SRa)

The arithmetic average roughness SRa of the recording surface of each magnetic tape was measured as described below. First, the recording surface of each magnetic tape was observed under an atomic force microscope (AFM) to obtain a two-dimensional (2D) surface profile data.

The following show AFM measuring conditions:
AFM: "Dimension 3100" manufactured by Digital Instruments, Inc.
Cantilever: NanoWorld Corporation, NCH-10T
Measuring area: square area of 30 μm×30 μm
Solution: 512×512
Scan direction of AFM probe: machine direction (MD) direction (longitudinal direction) of magnetic tape
Measuring mode: tapping mode
Scan ratio: 1 Hz.

Next, the 2D surface profile data having been obtained, surface$_{x,y}$ (nm) (x=0 to 511, y=0 to 511) was subjected to the following filtering. Hereinafter, the 2D surface profile data after the filtering will be referred to as "F surface$_{x,y}$".
Flatten: 3rd order
Planefit: 3rd order only in the MD direction.

Next, an average value Ave surface (nm) of F surface$_{x,y}$ (nm) was calculated using the following expression (1).

[Math. 1]

$$Ave\ \text{surface} = \frac{1}{(512)^2} \sum_{x,y} (F\ \text{surface}_{x,y}) \quad (1)$$

Next, the average surface roughness SRa (nm) was calculated using a difference between each point of F surface$_{x,y}$ (nm) and Ave surface (nm). Specifically, the average surface roughness SRa (nm) was calculated by the following expression (2).

[Math. 2]

$$SRa = \frac{1}{(512)^2} \sum_{x,y} |F\ \text{surface}_{x,y} * Ave\ \text{surface}| \quad (2)$$

(Number of Projections Having Height of 7.5 nm or More)

The number of projections Peak (7.5) (number) having a height of 7.5 nm or more included in the unit region of the recording surface was determined as described below. Here, the unit region is a square region with each side having a length of 30 μM.

First, F surface$_{x,y}$ (nm) was determined similarly to the above-described "arithmetic average roughness SRa". Next, by binarizing F surface$_{x,y}$ (nm) using Threshold$_{(7.5)}$ set by the following expression (3) as a reference value, N surface$_{(7.5)\ x,y}$ was obtained.

$$\text{Threshold}_{(7.5)}\ (nm) = Ave\ \text{surface}(nm) + 7.5\ (nm) \quad (3)$$

Specifically, N surface$_{(7.5)\ x,y}$ was obtained by comparing the magnitude relation between each point of F surface$_{x,y}$ (nm) and Threshold$_{(7.5)}$ (nm) as described below.

If F surface$_{x,y}$ (nm)≥Threshold$_{(7.5)}$ (nm) holds, N surface$_{(7.5)\ x,y}$=1 (judged as part of projections having a height of 7.5 nm or more)

If F surface$_{x,y}$ (nm)<Threshold$_{(7.5)}$ (nm) holds, N surface$_{(7.5)\ x,y}$=0 (judged as a portion that does not reach a height of 7.5 nm)

Next, N surface$_{(7.5)\ x,y}$ was subjected to labelling to count the number of projections. That is, a process of regarding continuous regions where N surface$_{(7.5)\ x,y}$=1 holds on two-dimensional data as "one projection region" was performed on the entire surface of the unit region, and then how many independent "one projection regions" exist was counted, and the numeric value was defined as "the number of projections having a height of 7.5 nm or more, Peak$_{(7.5)}$ (number)". Note that "continuous" in the labelling was conditioned on eight consecutive (eight adjacent) regions. That is, continuous portions in any of vertical, horizontal, and diagonal directions were regarded as "one projection region."

(Number of Projections Having Height of 5 nm, 10 nm, 15 nm, or 20 nm or More)

The number of projections having a height of 5 nm, 15 nm, 10 nm, or 20 nm or more in the unit region of the recording surface, Peak$_{(5)}$, Peak$_{(10)}$, Peak$_{(15)}$, or Peak$_{(20)}$ (number), was determined similarly to the above-described method of calculating "the number of projections having a height of 7.5 nm or more" except for binarizing F surface$_{x,y}$ (nm) using Threshold$_{(5)}$, Threshold$_{(10)}$, Threshold$_{(15)}$, and Threshold$_{(20)}$ set by the following expressions (4) to (7) as reference values:

$$\text{Threshold}_{(5)}\ (nm) = Ave\_surface(nm) + 5\ (nm) \quad (4)$$

$$\text{Threshold}_{(10)}\ (nm) = Ave\_surface\ (nm) + 10\ (nm) \quad (5)$$

$$\text{Threshold}_{(15)}\ (nm) = Ave\_surface(nm) + 15\ (nm) \quad (6)$$

$$\text{Threshold}_{(20)}\ (nm) = Ave\_surface(nm) + 20\ (nm) \quad (7)$$

(Evaluation of Recording and Reproducing Properties)

First, reproduction signals of the magnetic tapes were obtained using a loop tester (manufactured by Microphysics). The conditions for obtaining the reproduction signals are described below:
Head: GMR head
Speed: 2 m/s
Signal: Single recording frequency (10 MHz)
Recording current: Optimal recording current.

Next, the reproduction signals were captured by a spectrum analyzer in a span of 0 to 20 MHz (Resolution band width=100 kHz, VBW=30 kHz). Next, the peak of the captured spectrum was defined as a signal amount S and floor noise eliminating the peak is integrated to be defined as a noise amount N. Then, a ratio S/N of the signal amount S to the noise amount N was determined as SNR (Signal-to-Noise Ratio). Next, the determined SNR was converted to a relative value (dB) on the basis of SNR of Comparative Example 1 as a reference medium.

Next, the quality of recording and reproducing properties was judged as described below using SNR (dB) obtained as described above.

Good: SNR of magnetic tape exceeds SNR (=0 (dB)) of evaluation reference sample (Comparative Example 1)

Poor: SNR of magnetic tape is SNR (=0 (dB)) of evaluation reference sample (Comparative Example 1) or less.

On the basis of the above-described judgment result, a graph was made plotting the number of projections having each height or more included in the unit region on the horizontal axis and plotting recording and reproducing properties on the vertical axis to study whether there is a correlation between the number of projections having each height or more included in the unit region and recording and reproducing properties.

(Friction)

By placing and transporting a magnetic recording tape in a tape transport device, friction of the recording surface of the magnetic tape was measured. As the transport device, a reel-to-reel tape transport device (manufactured by Mountain Engineering II, Inc., MTS Transport device) was used. A prism (AlTiC material) was placed at a predetermined position on a tape transport path so as to slide over the recording surface of the tape. By placing a strain gauge on the AlTiC rectangular material and measuring an increase and decrease of "a force applied to the prism" due to the slide between the tape and rectangular material with the strain gauge, the magnitude of frictional force between the tape and rectangular material can be measured.

Specifically, friction of the recording surface of the magnetic tape was measured as described below. First, the magnetic tape of Example 1 as an evaluated magnetic tape was mounted on the tape transport device. Next, a prism (AlTiC material) was placed such that a wrap angle of the magnetic tape of the recording surface became 1.5 degrees. Next, the magnetic tape was transported at a transport speed of 2 msec and a tape tension of 60 gf. Next, changes over time in voltage output from the strain gauge were obtained as a data string $Vx_j$ for 1.5 seconds (that is, 3 m) at 2500 times/sec using a digital oscilloscope (AC coupling). Next, a sum of squares of the obtained data string $Vx_j$ of the strain gauge was calculated using the following expression (8) to obtain a frictional force Fx of the magnetic tape.

[Math. 3]

$$Fx = \sum_j (Vx_j)^2 \qquad (8)$$

Next, the magnetic tape of Comparative Example 1 as an evaluation reference magnetic tape was also subjected to a measurement similar to that for the magnetic tape of Example 1, and an obtained frictional force was denoted as Ff.

Next, using the frictional force Ff of the magnetic tape of Comparative Example 1 (evaluation reference magnetic tape) as a reference frictional force (100(%)), the frictional force Fx of the magnetic tape of Example 1 (evaluated magnetic tape) was converted to a relative frictional force, relative-Fx (%).

Examples 2 to 12 as evaluated magnetic tapes and the magnetic tapes of Comparative Examples 2 to 7 were also subjected to measurements similar to the foregoing to calculate relative frictional forces, relative-F (%), of these magnetic tapes.

Next, the quality of the frictional force was judged as described below using the relative frictional forces, relative-F (%), obtained as described above.

Good: SNR of magnetic tape is less than frictional force (=100(%)) of evaluation reference sample (Comparative Example 1).

Poor: SNR of magnetic tape is SNR (=100(%)) of evaluation reference sample (Comparative Example 1) or more.

On the basis of the above-described judgment result, a graph was made plotting the number of projections having each height or more included in the unit region on the horizontal axis and plotting the frictional force on the vertical axis to study whether there is a correlation between the number of projections having each height or more included in the unit region and frictional force.

(Evaluation Results)

Table 1 shows presence/absence of a correlation between the number of projections having each height or more included in the unit region of the recording surface and recording and reproducing properties as well as a correlation between the number of projections having each height or more included in the unit region of the recording surface and frictional force.

TABLE 1

| Height of projections | Presence/absence of correlation | |
|---|---|---|
| | Number of projections-recording and reproducing properties | Number of projections-high-speed friction |
| 5 nm or more | absent | absent |
| 7.5 nm or more | absent | present |
| 10 nm or more | absent | absent |
| 15 nm or more | present | absent |
| 20 nm or more | absent | absent |

Figure 8:
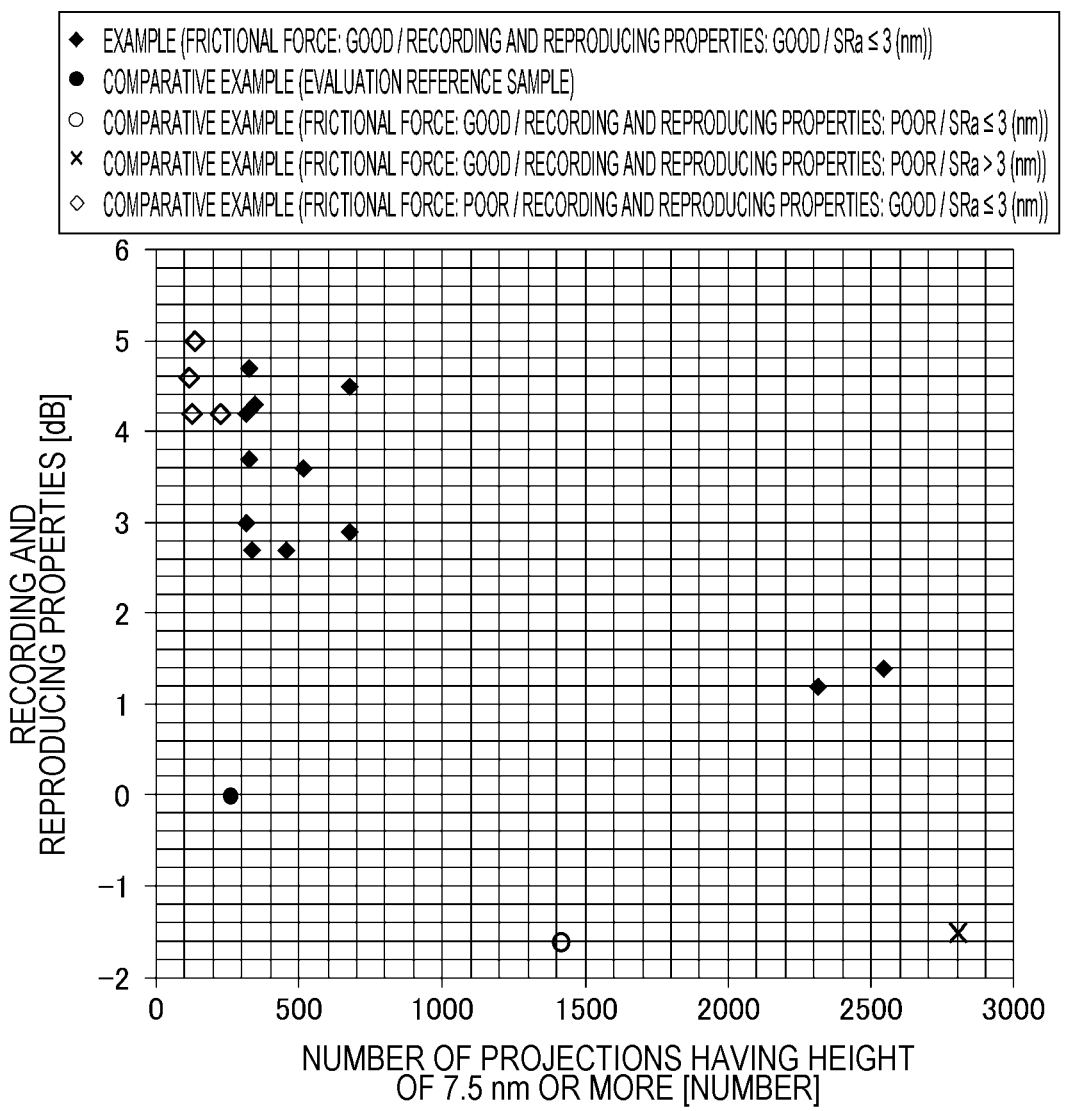
FIG. 8 is a graph illustrating a relation between the number of projections having a height of 7.5 nm or more included in a unit region and recording and reproducing properties.
Figure 9:
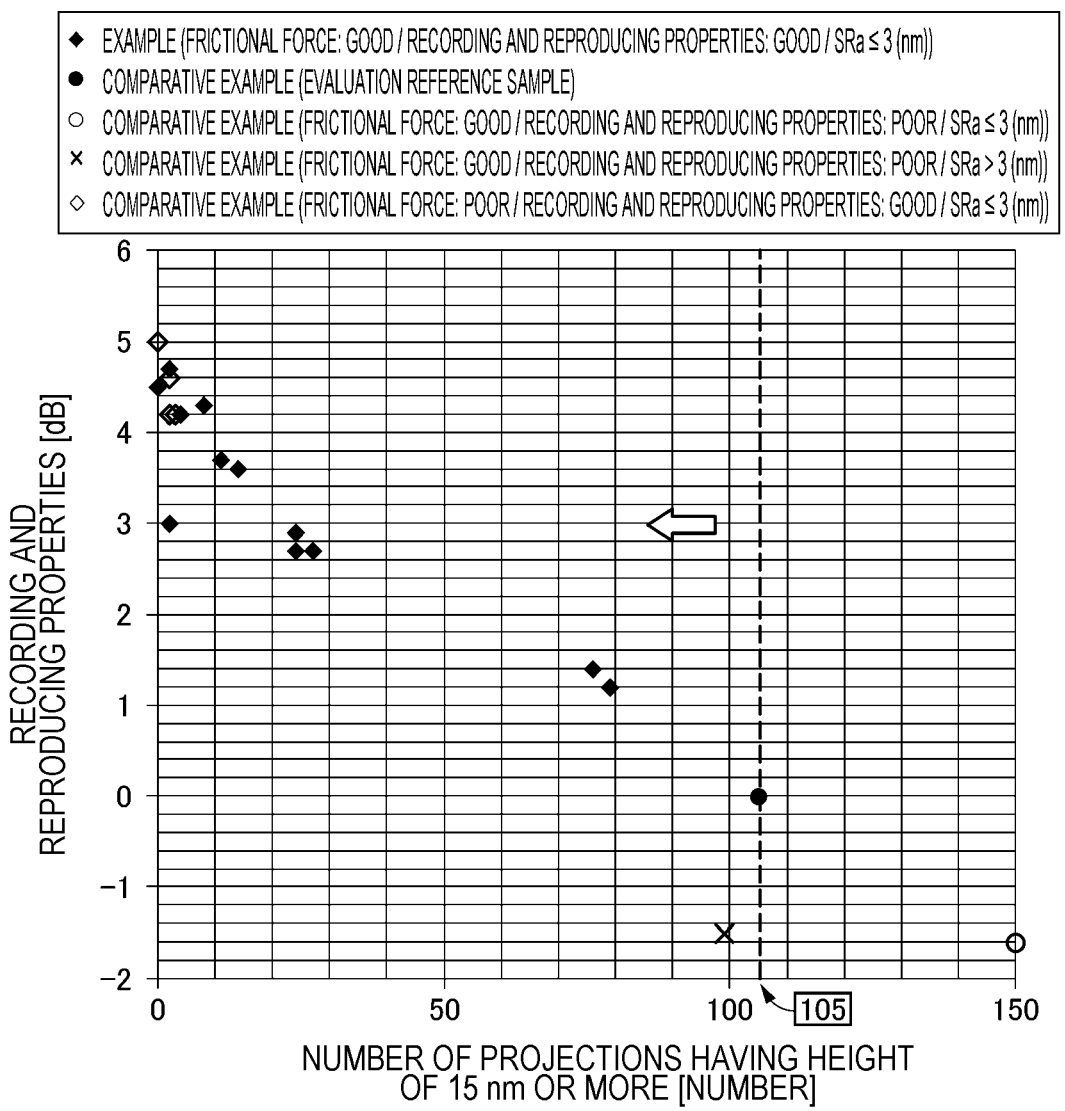
FIG. 9 is a graph illustrating a relation between the number of projections having a height of 15 nm or more included in a unit region and recording and reproducing properties.
Figure 10:
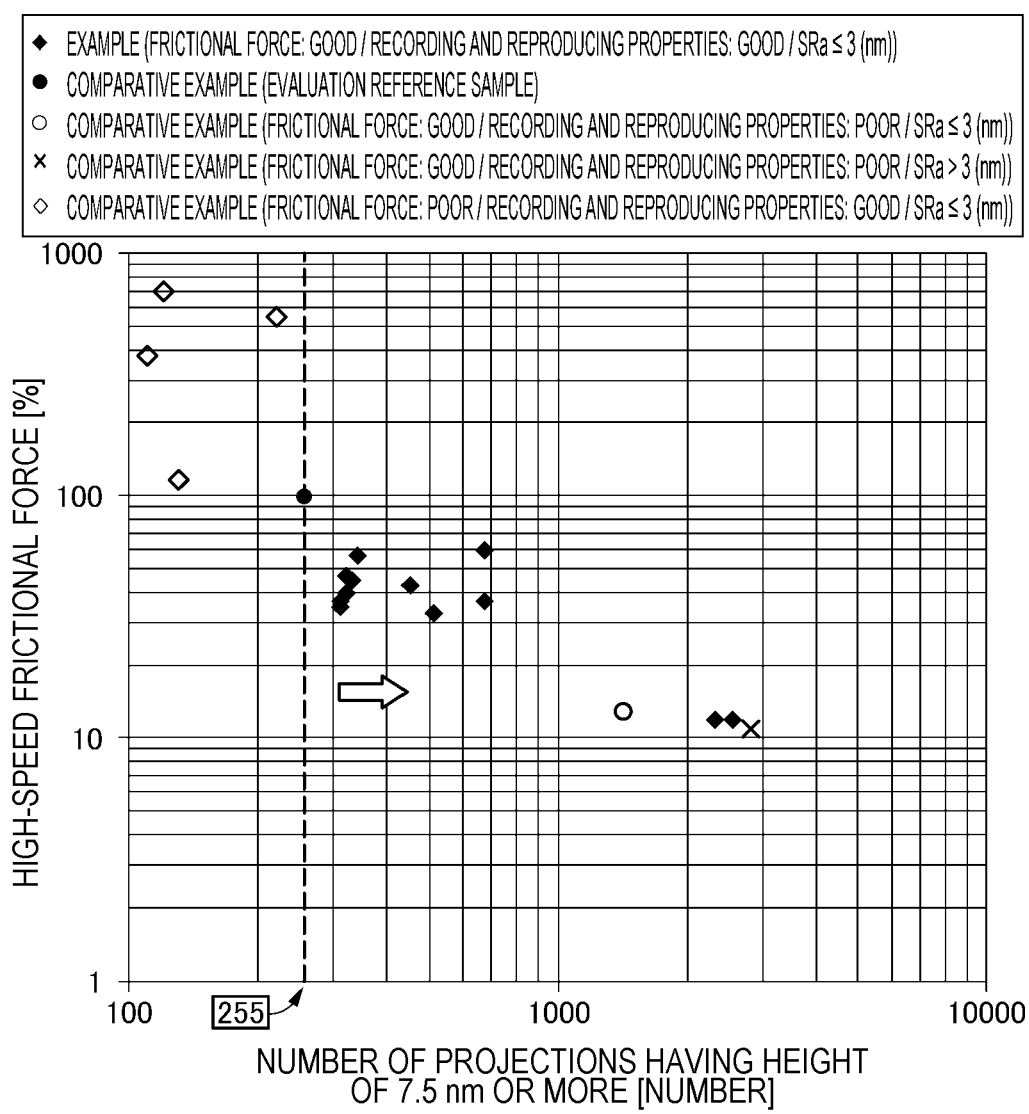
FIG. 10 is a graph illustrating a relation between the number of projections having a height of 7.5 nm or more included in the unit region and a high-speed frictional force.
Figure 11:
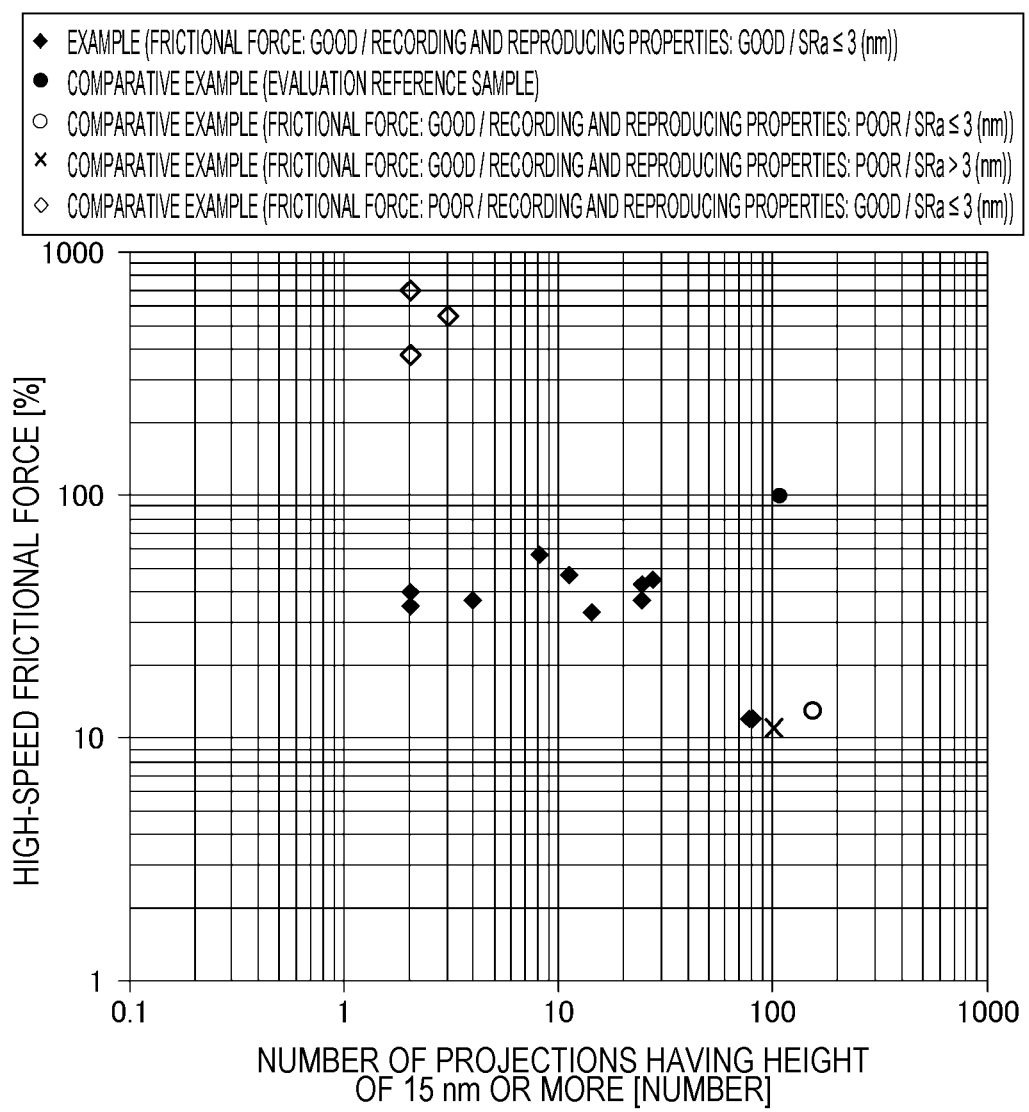
FIG. 11 is a graph illustrating a relation between the number of projections having a height of 15 nm or more included in the unit region and a high-speed frictional force.

Among graphs made for studying correlations, FIG. 8 and FIG. 9 representatively illustrate graphs each showing a relation between the number of projections having a height of 7.5 nm or 15 nm or more included in the unit region of the recording surface and recording and reproducing properties. Moreover, among graphs made for studying correlations, FIG. 10 and FIG. 11 representatively illustrate graphs each showing a relation between the number of projections having a height of 7.5 nm or 15 nm or more included in the unit region of the recording surface and frictional force.

Note that symbols plotted in FIG. 8 to FIG. 11 "♦", "●", "○", "x", and "◇" indicate the following judgment results. Since the number of projections having a height of 15 nm or more included in the unit region of the recording surface is "0" in the magnetic tapes of Example 10 and Comparative Example 5, evaluation results of Example 10 and Comparative Example 5 are not depicted in FIG. 11.

♦: Good frictional force, good recording and reproducing properties, and SRa≤3 (nm) (Examples 1 to 12)

●x Evaluation reference sample (Comparative Example 1)

○1 Good frictional force, poor recording and reproducing properties, and SRa≤3 (nm) (Comparative Example 6)

x: Good frictional force, poor recording and reproducing properties, and SRa>3 (nm) (Comparative Example 7)

◇: Poor frictional force, good recording and reproducing properties, and SRa≤3 (nm) (Comparative Examples 2 to 5)

Table 1 and FIG. 8 to FIG. 11 reveal the following.

A correlation is recognized between the number of projections having a height of 7.5 nm or more included in the unit region of the recording surface and high-speed friction. In contrast, no correlation is recognized between the number of projections having a height of 5 nm, 10 nm, 15 nm, or 20 nm or more included in the unit region of the recording surface and high-speed friction.

A correlation is recognized between the number of projections having a height of 15 nm or more included in the unit region of the recording surface and recording and reproducing properties. In contrast, no correlation is recognized between the number of projections having a height of 5 nm, 7.5 nm, 10 nm, or 20 nm or more included in the unit region of the recording surface and recording and reproducing properties.

Table 2 shows structures and evaluation results of the magnetic tapes of Examples 1 to 12 and Comparative Examples 1 to 7. Note that Table 2 only shows the number of projections having a height of 15 nm or more recognized as having a correlation with recording and reproducing properties and the number of projections having a height of 7.5 nm or more recognized as having a correlation with high-speed friction as described above.

having a correlation with recording and reproducing properties and the number of projections having a height of 7.5 nm or more recognized as having a correlation with a frictional force as described above. Note that symbols plotted in FIG. 12 "♦", "●", "○", "x", and "◇" indicate the above-described judgment results. Since the number of projections having a height of 15 nm or more included in the unit region of the recording surface is "0" in the magnetic tapes of Example 10 and Comparative Example 5, evaluation results of Example 10 and Comparative Example 5 are not depicted in FIG. 12.

TABLE 2

| | | Recording surface | | | Recording | |
| --- | --- | --- | --- | --- | --- | --- |
| | Type of base substance | Presence/ absence of uneven layer | SRa [nm] | Peak (15) [number] | Peak (7.5) [number] | and reproducing properites [dB] | Frictional force [%] |
| Example 1 | Film A | Absent | 1.8 | 24 | 670 | 2.9 | 37 |
| Example 2 | Film A | Absent | 1.7 | 14 | 510 | 3.6 | 33 |
| Example 3 | Film A | Absent | 1.7 | 4 | 310 | 4.2 | 37 |
| Example 4 | Film A | Absent | 1.7 | 2 | 320 | 4.7 | 40 |
| Example 5 | Film B | Absent | 1.6 | 27 | 330 | 2.7 | 45 |
| Example 6 | Film B | Absent | 1.5 | 24 | 450 | 2.7 | 43 |
| Example 7 | Film B | Absent | 1.4 | 11 | 320 | 3.7 | 47 |
| Example 8 | Film B | Absent | 1.4 | 8 | 340 | 4.3 | 57 |
| Example 9 | Film B | Absent | 2.8 | 76 | 2540 | 1.4 | 12 |
| Example 10 | Film B | Present | 2.1 | 0 | 670 | 4.5 | 60 |
| Example 11 | Film B | Present | 2.9 | 79 | 2310 | 1.2 | 12 |
| Example 12 | Film B | Absent | 1.6 | 2 | 310 | 3.0 | 35 |
| Comparative Example 1 | Film B | Absent | 1.5 | 105 | 255 | 0.0 | 100 |
| Comparative Example 2 | Film B | Absent | 1.4 | 2 | 120 | 4.2 | 700 |
| Comparative Example 3 | Film B | Absent | 1.4 | 2 | 110 | 4.6 | 380 |
| Comparative Example 4 | Film B | Absent | 1.4 | 3 | 220 | 4.2 | 550 |
| Comparative Example 5 | Film B | Absent | 1.5 | 0 | 130 | 5.0 | 117 |
| Comparative Example 6 | Film B | Present | 2.3 | 150 | 1410 | −1.6 | 13 |
| Comparative Example 7 | Film B | Present | 3.2 | 99 | 2800 | −1.5 | 11 |

Films A, B, SRa, Peak (15), and Peak (7.5) shown in Table 2 mean the following details.

Film A: a PET film having the average surface roughness SRa as well as the number of projections having a height of 7.5 nm or more and the number of projections having a height of 15 nm or more included in the unit region on the surface substantially similar to those of the recording surface of the magnetic tape of Example 1

Film B: a PET film having the average surface roughness SRa as well as the number of projections having a height of 7.5 nm or more and the number of projections having a height of 15 nm or more included in the unit region on the surface substantially similar to those of the recording surface of the magnetic tape of Comparative Example 1

SRa: the average surface roughness of the recording surface

Peak (15): the number of projections having a height of 15 nm or more included in the unit region of the recording surface Peak (7.5): the number of projections having a height of 7.5 nm or more included in the unit region of the recording surface.

Figure 12:
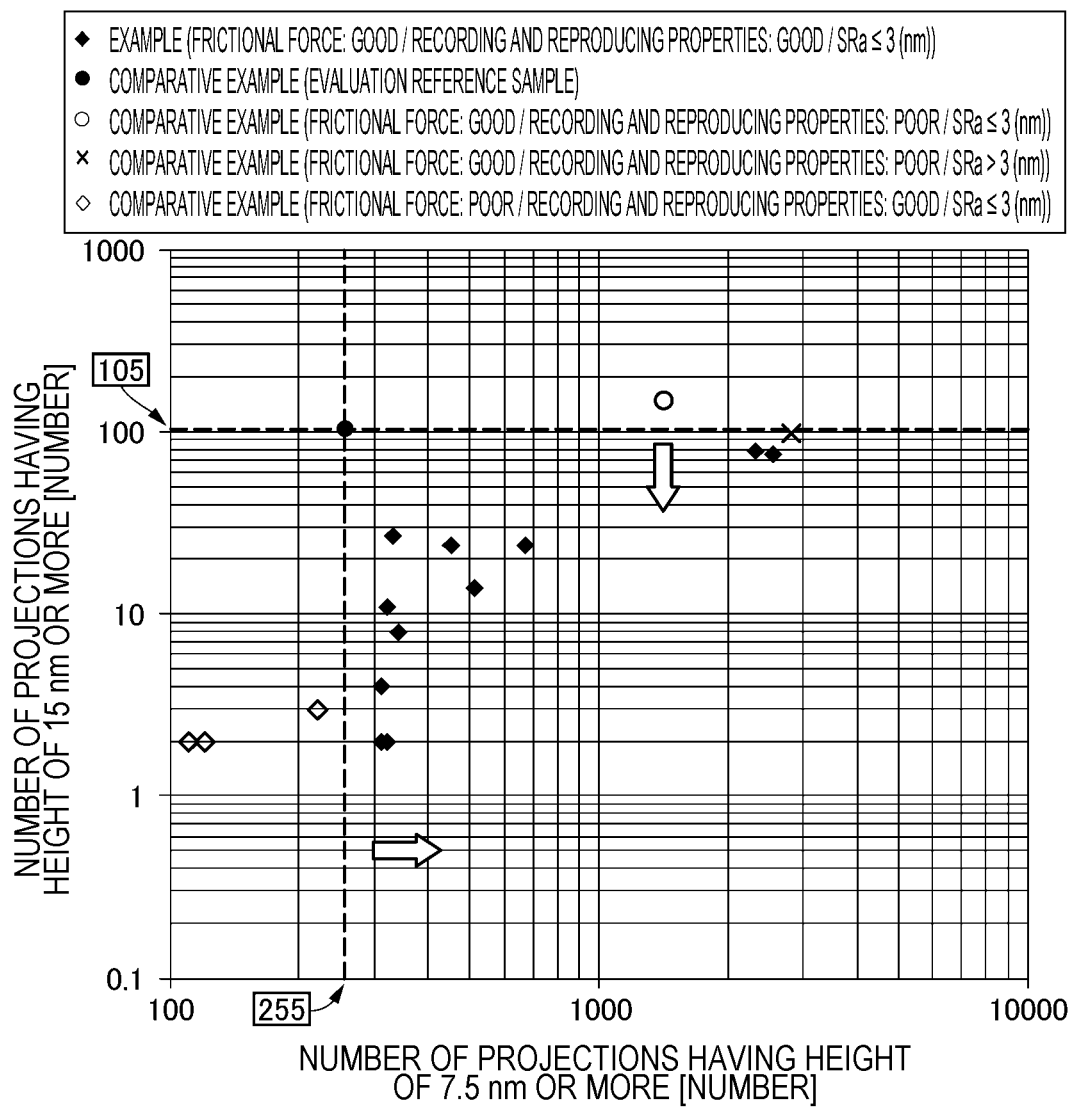
FIG. 12 is a graph illustrating a relation between the number of projections having a height of 7.5 nm or more and the number of projections having a height of 15 nm or more included in the unit region and evaluation results of recording and reproducing properties and a high-speed frictional force.

FIG. 12 illustrates a relation between the number of projections having a height of 15 nm or more recognized as FIG. 9 in which a correlation is recognized between the number of projections and recording and reproducing properties reveals the following. That is, under the condition that SRa is 3.0 nm or less holds, the recording and reproducing properties tend to be improved as the number of projections having a height of 15 nm or more included in the unit region of the recording surface decreases. When the number of projections having a height of 15 nm or more included in the unit region of the recording surface is 104 or less, recording and reproducing properties better than those of the evaluation reference sample are obtained. From the viewpoint of improving recording and reproducing properties, the number of projections having a height of 15 nm or more included in the unit region of the recording surface is preferably 0 or more and 75 or less, more preferably 0 or more and 50 or less, still more preferably 0 or more and 25 or less, and most preferably 0 or more and 10 or less.

FIG. 10 in which a correlation is recognized between the number of projections and a frictional force reveals the following. That is, under the condition that SRa is 3.0 nm or less holds, the frictional force tends to be reduced as the number of projections having a height of 7.5 nm or more included in the unit region of the recording surface increases. When the number of projections having a height of 7.5 nm or more included in the unit region of the recording surface is 256 or more, a frictional force lower than that of the reference sample is obtained. From the viewpoint of reducing the frictional force, the number of projections having a height of 7.5 nm or more included in the unit region of the recording surface is preferably 500 or more, more preferably 1000 or more, still more preferably 2000 or more, and most preferably 2500 or more.

FIG. 12 collectively illustrating the evaluation results illustrated in FIG. 9 to FIG. 11 reveals the following. When the number of projections having a height of 15 nm or more included in the unit region of the recording surface is 104 or less and the number of projections having a height of 7.5 nm or more included in the unit region of the recording surface is 256 or more under the condition that SRa is 3.0 nm or less holds, it is possible to improve the recording and reproducing properties with respect to those of the evaluation reference sample and to reduce the frictional force with respect to that of the evaluation reference sample.

Even in a case of using any of the crystal control layers of Examples 1 to 11 and the crystal control layer of Example 12, when the number of projections having a height of 15 nm or more included in the unit region of the recording surface is 104 or less and the number of projections having a height of 7.5 nm or more included in the unit region of the recording surface is 256 or more under the condition that SRa is 3.0 nm or lessholds, it is possible to improve the recording and reproducing properties with respect to those of the evaluation reference sample and to reduce the frictional force with respect to that of the evaluation reference sample.

The embodiments, their variations and examples of the present technique are specifically described above but the present technique is not limited to the above-described embodiments, their variations and examples and can be variously modified based on the technical idea of the present technique.

For example, the configurations, methods, processes, shapes, materials, numerical values, and the like mentioned in the above-described embodiments, their variations and examples are merely an example and configurations, methods, processes, shapes, materials, numerical values, and the like different from those in the embodiments may be used if necessary.

The configurations, methods, processes, shapes, materials, numerical values, and the like of the above-described embodiments, their variations and examples can be combined without deviating from the scope of the present technique.

Additionally, the present technology may also be configured as below.

(1)

A magnetic recording medium including:
a base substance having flexibility;
a crystal control layer provided on the base substance; and
a magnetic layer provided on the crystal control layer, in which
the magnetic recording medium has a recording surface having an average surface roughness SRa of 3.0 nm or less,
the number of projections having a height of 7.5 nm or more included in a unit region (where the unit region is a square region with each side having a length of 30 μm) of the recording surface is 256 or more, and
the number of projections having a height of 15 nm or more included in the unit region of the recording surface is 0 or more and 104 or less.

(2)

The magnetic recording medium according to (1), in which
the base substance has an uneven surface on the recording surface side, and
the uneven surface of the base substance has an uneven shape substantially similar to the recording surface.

(3)

The magnetic recording medium according to (2), in which the recording surface substantially conforms to the uneven surface of the base substance.

(4)

The magnetic recording medium according to (1), including:
an uneven layer provided between the base substance and the crystal control layer and having an uneven surface on the crystal control layer side, in which
the uneven layer contains particulates.

(5)

The magnetic recording medium according to (4), in which the uneven layer is a coating layer.

(6)

The magnetic recording medium according to (4) or (5), in which the uneven surface of the uneven layer is composed of the particulates.

(7)

The magnetic recording medium according to any one of (4) to (6), in which the uneven surface of the uneven layer has an uneven shape substantially similar to the recording surface.

(8)

The magnetic recording medium according to (7), in which the recording surface substantially conforms to the uneven surface of the uneven layer.

(9)

The magnetic recording medium according to any one of (1) to (3), in which the crystal control layer and the magnetic layer are sputtering films.

(10)

The magnetic recording medium according to any one of (1) to (9), in which
the crystal control layer includes
a foundation layer, and
a seed layer provided between the foundation layer and the base substance.

(11)

The magnetic recording medium according to (10), in which the seed layer has an amorphous state.

(12)

The magnetic recording medium according to (10) or (11), in which the seed layer contains Ti and Cr.

(13)

The magnetic recording medium according to any one of (10) to (12), in which the foundation layer contains Ru.

(14)

The magnetic recording medium according to (10), in which the seed layer contains Cr, Ni, and Fe.

(15)

The magnetic recording medium according to (10), in which
the crystal control layer further includes an intermediate layer provided between the seed layer and the foundation layer,
the seed layer contains Cr, Ni, and Fe, and
the intermediate layer contains Co and O.

(16)

The magnetic recording medium according to any one of (1) to (15), further including:

a soft magnetic layer provided between the base substance and the crystal control layer.

(17)
The magnetic recording medium according to (16), in which
the soft magnetic layer includes a first soft magnetic layer, an intermediate layer, and a second soft magnetic layer, and
the intermediate layer is provided between the first soft magnetic layer and the second soft magnetic layer.

(18)
The magnetic recording medium according to (16) or (17), further including:
a seed layer provided between the base substance and the soft magnetic layer.

(19)
The magnetic recording medium according to any one of (1) to (18), in which the magnetic layer has a granular structure obtained by separating particles containing Co, Pt, and Cr by an oxide.

(20)
The magnetic recording medium according to (19), in which the magnetic layer has an average composition shown in the following expression:

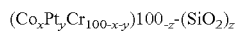

$(Co_xPt_yCr_{100-x-y})100_{-z}$-$(SiO_2)_z$ (where x, y, and z are values in the range of 69≤x≤72, 12≤y≤16, and 9≤z≤12, respectively).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 11 base substance
12, 12A, 12B, 40 crystal control layer
13 magnetic layer
14 protective layer
15 lubricant layer
16 backcoat layer
17 uneven layer
18, 21, 41 seed layer
19 SUL
19A APC-SUL
19a, 19c soft magnetic layer
19b, 42 intermediate layer
22 foundation layer
31 film formation chamber
32 drum
33a, 33b, 33c cathodes
34 supply reel
35 take-up reel

The invention claimed is:

1. A magnetic recording medium comprising:
a base substance having flexibility;
a crystal control layer provided on the base substance; and
a magnetic layer provided on the crystal control layer, wherein
the magnetic recording medium has a recording surface having an average surface roughness SRa of 3.0 nm or less,
the number of projections having a height of 7.5 nm or more included in a unit region of the recording surface is 256 or more and 3000 or less, the unit region is a square region with each side having a length of 30 μm, and
the number of projections having a height of 15 nm or more included in the unit region of the recording surface is 0 or more and 104 or less.

2. The magnetic recording medium according to claim 1, wherein
the base substance has an uneven surface on the recording surface side, and
the uneven surface of the base substance has an uneven shape substantially similar to the recording surface.

3. The magnetic recording medium according to claim 2, wherein the recording surface substantially conforms to the uneven surface of the base substance.

4. The magnetic recording medium according to claim 1, comprising:
an uneven layer provided between the base substance and the crystal control layer and having an uneven surface on the crystal control layer side, wherein
the uneven layer contains particulates.

5. The magnetic recording medium according to claim 4, wherein the uneven surface of the uneven layer is composed of the particulates.

6. The magnetic recording medium according to claim 4, wherein the uneven surface of the uneven layer has an uneven shape substantially similar to the recording surface.

7. The magnetic recording medium according to claim 6, wherein the recording surface substantially conforms to the uneven surface of the uneven layer.

8. The magnetic recording medium according to claim 1, wherein the crystal control layer and the magnetic layer are sputtering films.

9. The magnetic recording medium according to claim 1, wherein the crystal control layer includes
a foundation layer, and
a seed layer provided between the foundation layer and the base substance.

10. The magnetic recording medium according to claim 9, wherein the seed layer has an amorphous state.

11. The magnetic recording medium according to claim 9, wherein the seed layer contains Ti and Cr.

12. The magnetic recording medium according to claim 9, wherein the foundation layer contains Ru.

13. The magnetic recording medium according to claim 9, wherein the seed layer contains Cr, Ni, and Fe.

14. The magnetic recording medium according to claim 9, wherein
the crystal control layer further includes an intermediate layer provided between the seed layer and the foundation layer,
the seed layer contains Cr, Ni, and Fe, and
the intermediate layer contains Co and O.

15. The magnetic recording medium according to claim 1, further comprising:
a soft magnetic layer provided between the base substance and the crystal control layer.

16. The magnetic recording medium according to claim 15, wherein
the soft magnetic layer includes a first soft magnetic layer, an intermediate layer, and a second soft magnetic layer, and
the intermediate layer is provided between the first soft magnetic layer and the second soft magnetic layer.

17. The magnetic recording medium according to claim 15, further comprising:

a seed layer provided between the base substance and the soft magnetic layer.

18. The magnetic recording medium according to claim 1, wherein the magnetic layer has a granular structure obtained by separating particles containing Co, Pt, and Cr by an oxide.

19. The magnetic recording medium according to claim 18, wherein the magnetic layer has an average composition shown in the following expression:

$$(Co_xPt_yCr_{100-x-y})_{100-z}—(SiO_2)_z$$

(where x, y, and z are values in the range of 69≤x≤72, 12≤y≤16, and 9≤z≤12, respectively).

20. The magnetic recording medium according to claim 1, wherein the number of projections having a height of 7.5 nm or more included in the unit region of the recording surface is from 2500 to 3000.

21. The magnetic recording medium according to claim 1, wherein the number of projections having a height of 15 nm or more included in the unit region of the recording surface is from 0 to 10.

* * * * *